US008205090B2

(12) United States Patent
Oom Temudo de Castro et al.

(10) Patent No.: US 8,205,090 B2
(45) Date of Patent: Jun. 19, 2012

(54) SECURE RECOVERY IN A SERVERLESS DISTRIBUTED FILE SYSTEM

(75) Inventors: Miguel Oom Temudo de Castro, Cambridge (GB); Atul Adya, Redmond, WA (US); John R. Douceur, Bellevue, WA (US); William J. Bolosky, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/235,343

(22) Filed: Sep. 22, 2008

(65) Prior Publication Data

US 2009/0019288 A1 Jan. 15, 2009

Related U.S. Application Data

(62) Division of application No. 10/310,440, filed on Dec. 5, 2002, now Pat. No. 7,428,751.

(51) Int. Cl.
H04L 9/00 (2006.01)
(52) U.S. Cl. ........................................ 713/181; 713/168
(58) Field of Classification Search ......................... None
See application file for complete search history.

(56) References Cited

U.S. PATENT DOCUMENTS

| 5,778,395 | A  | 7/1998  | Whiting et al.  |
| 5,924,094 | A  | 7/1999  | Sutter          |
| 6,247,026 | B1 | 6/2001  | Waldo et al.    |
| 6,301,658 | B1 | 10/2001 | Koehler         |
| 6,732,124 | B1 | 5/2004  | Koseki et al.   |
| 6,847,984 | B1 | 1/2005  | Midgley et al.  |
| 6,952,737 | B1 | 10/2005 | Coates et al.   |
| 7,069,443 | B2 | 6/2006  | Berringer et al.|
| 7,216,135 | B2 | 5/2007  | Sawdon et al.   |
| 7,328,341 | B1 | 2/2008  | Eun et al.      |
| 2001/0047400 | A1 | 11/2001 | Coates et al. |
| 2001/0051955 | A1 | 12/2001 | Wong          |
| 2002/0194209 | A1 | 12/2002 | Bolosky et al.|

FOREIGN PATENT DOCUMENTS

| EP | 1246061      | 10/2002 |
| JP | 63120344 A   | 5/1988  |
| JP | 2001034580 A | 2/2001  |
| JP | 2001101054 A | 4/2001  |
| JP | 2002140295 A | 5/2002  |

OTHER PUBLICATIONS

Castro et al., "Practical Byzantine Fault Tolerance", Feb. 1999, pp. 1-14.*

(Continued)

*Primary Examiner* — Minh Dinh
(74) *Attorney, Agent, or Firm* — Lee & Hayes, PLLC

(57) ABSTRACT

Systems and methods for secure file writes after a catastrophic event are allowed over an unauthenticated channel in a serverless distributed file system if an authenticator accompanies the secure file writes. The authenticator can be a power-of-attorney certificate with time limitations, a vector of message authenticated code, or a single message authenticator with secured with a secret shared among members of the serverless distributed file system. The serverless distributed file system includes at least 3f+1 participating computer members, with f representing a number of faults tolerable by the system. The group requires at least one authenticator for file creation and file uploads. Any changes to files stored among the members can be made over an unauthenticated channel if the file changes are secured by the authenticator and the group is able to verify the authenticator.

9 Claims, 13 Drawing Sheets

OTHER PUBLICATIONS

Martin et al., "Minimal Byzantine Storage", Lecture Notes in Computer Science, 2002, vol. 2508, pp. 311-325.*

Bolosky, et al., "Feasibility of a Serverless Distributed File System Deployed on an Existing Set of Desktop PCs", ACM, 2000, pp. 1-10.

Farrell, et al., "An Internet Attribute Certificate Profile for Authorization", The Internet Society, Apr. 2002, pp. 1-20.

Maziers, et al., "Don't Trust your File Server", 8th HotOS, May 2001, pp. 113-118.

Rowstron, et al., "Storage Management and Caching in PAST, a large-scale, persistent peer-to-peer storage utililty", ACM, 2001, pp. 1-13.

Thompson, et al., "Certificate-Based Access Control for Widely Distributed Resources", Proceeding of the 8th USENIX Security Symposium, 1999, pp. 1-14.

Tompa, et al., "How to Share a Secret with Cheaters", Journal of Cryptology, 1, 1988, pp. 261-265.

Kimura, Daisuke, "ServicePack 4 1E5.0 Windows 2000", Windows NT Press, No. 5, Gijutsu-Hyohron Co., Ltd., Japan, Feb. 25, 1999, pp. 38-49.

Saito et al, "An Access Control with Handling Private Information", Computer Security Symposium 2000, Information Processing Society of Japan, Japan, Oct. 26, 2000, vol. 2000, No. 12, pp. 56-60.

Notice of Rejection for Japanese Patent Application No. 2003-405163 mailed on Apr. 23, 2010, 7 pgs.

EPO Communication for European Application No. 03 026 963.3 mailed on Jun. 8, 2010, 6 pgs.

Notice of Allowance for Japanese Patent Application No. 2003-405163, mailed Dec. 24, 2010, 6 pgs.

Translated Japanese Office Action mailed Nov. 8, 2011 for Japanese Patent Application No. 2010-186592, a counterpart foreign application of US patent No. 7,428,751, 8 pages.

Japanese Office Action mailed Mar. 2, 2012 for Japanese Patent Application No. 2010-186592, a counterpart foreign application of US patent No. 7,428,751, 8 pages.

* cited by examiner

US 8,205,090 B2

SECURE RECOVERY IN A SERVERLESS DISTRIBUTED FILE SYSTEM

RELATED APPLICATION

This application is a continuation of, claims the benefit of priority from, and hereby incorporates by reference the entire disclosure of U.S. patent application Ser. No. 10/310,440, filed on Dec. 5, 2002, and titled "Secure Recovery in a Serverless Distributed File System".

BACKGROUND OF THE INVENTION

File systems manage files and other data objects stored on computer systems. File systems were originally built into a computers operating system to facilitate access to files stored locally on resident storage media. As computers became networked, some file storage capabilities were offloaded from individual user machines to special storage servers that stored large numbers of files on behalf of the user machines. When a file was needed, the user machine simply requested the file from the server. In this server-based architecture, the file system was extended to facilitate management of and access to files stored remotely at the storage server over a network.

Today, file storage is migrating toward a model in which files are stored on various networked computers, rather than on a central storage server. The serverless architecture poses new challenges to file systems. One particular challenge concerns managing files that are distributed over many different computers in a manner that allows files to be reliably stored and accessible in spite of varying ones of the computers being inaccessible at any given time, while at the same time preventing access to the files by non-authorized users. Of particular importance is the need to protect data stored on the computers in the event of a catastrophe that potentially allows a hacker or unauthorized user of a computer to alter or destroy data stored in the networked computers.

The invention addresses these challenges and provides solutions that are effective for serverless distributed file systems.

BRIEF SUMMARY OF THE INVENTION

Methods and systems for recovering from catastrophic events in a serverless distributed file system are described herein. More particularly, systems and methods for secure file writes after a catastrophic event are allowed over an unauthenticated channel in a serverless distributed file system if an authenticator accompanies the secure file writes. The authenticator can be a power-of-attorney certificate with time limitations, a vector of message authentication codes (MACs), or a single message authenticator code (MAC) secured with a secret shared among members of the serverless distributed file system. The serverless distributed file system includes at least 3f+1 participating computer members, with $f$ representing a number of faults tolerable by the system. The group requires at least one authenticator for file creation and file uploads.

In one embodiment, the authenticator is a power-of-attorney certificate, the power-of-attorney certificate having predetermined criteria including a time component that allows the file uploads for a predetermined amount of time.

In another embodiment, the authenticator is a message authentication code secured by a secret key. The group receives a log from a client machine, the log including file writes and authenticated by the message authentication code. A secret key is associated with the message authentication code such that reconstruction of the secret key requires f+1 members of the group to provide a share of the secret key.

In one embodiment, the authenticator is a vector of MACs, secured by a plurality of secrets, each member of the group having one of the plurality of secrets. In the embodiment, the group configured to require at least f+1 members to authenticate the upload. More particularly, in the embodiment, each member receives one of n authenticators, and later receives, over an insecure channel, a transmit containing one or more file updates secured with a hash of file content and a vector of MACs created using the n authenticators. The n authenticators can be UMAC message authentication codes. .

In another embodiment, the authenticator is one of a plurality of certificates shared by the serverless distributed file system, each certificate of the plurality of certificates having a serial number, the distributed file system denying authorization for out-of-sequence certificates thereby preventing selective choice of certificates.

A method according to an embodiment includes transmitting file writes to a fault tolerant directory group outside of an authenticated channel, identifying the one or more file writes with at least one authenticator, the at least one authenticator requiring the directory group to reconstruct at least one secret key to authorize the one or more file writes. The number of members in the fault tolerant directory group required to reconstruct the secret key is at least three times the number of faults tolerable by the fault tolerant directory group plus one.

Another embodiment is directed to method for file writes to a fault tolerant directory group outside of an authenticated channel. The method includes creating a log in a client machine, the log including the file writes and the log authenticated by a message authentication code secured with a secret key associated with the message authentication code. Reconstruction of the secret key requires a number of members of the fault tolerant directory group to provide a share of the secret key, the number being at least one plus a number of tolerable faults of the fault tolerant directory group. The method further includes transmitting the log outside the authenticated channel.

One embodiment is directed to a computer-readable medium having computer-executable instructions for enabling file writes to a fault tolerant directory group outside of an authenticated channel, the computer-executable instructions performing acts including creating a log including the file writes$_{13}$ The log is authenticated by a message authentication code secured with a secret key associated with the message authentication code. Reconstruction of the secret key requires a 3f+1 members of the fault tolerant directory group to provide a share of the secret key, the f being the number of tolerable faults for the fault tolerant directory group. The instructions also enable a client machine to transmit the log outside the authenticated channel. Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

The same numbers are used throughout the document to reference like components and/or features.

DETAILED DESCRIPTION OF THE INVENTION

Serverless Distributed File System

Figure 1:
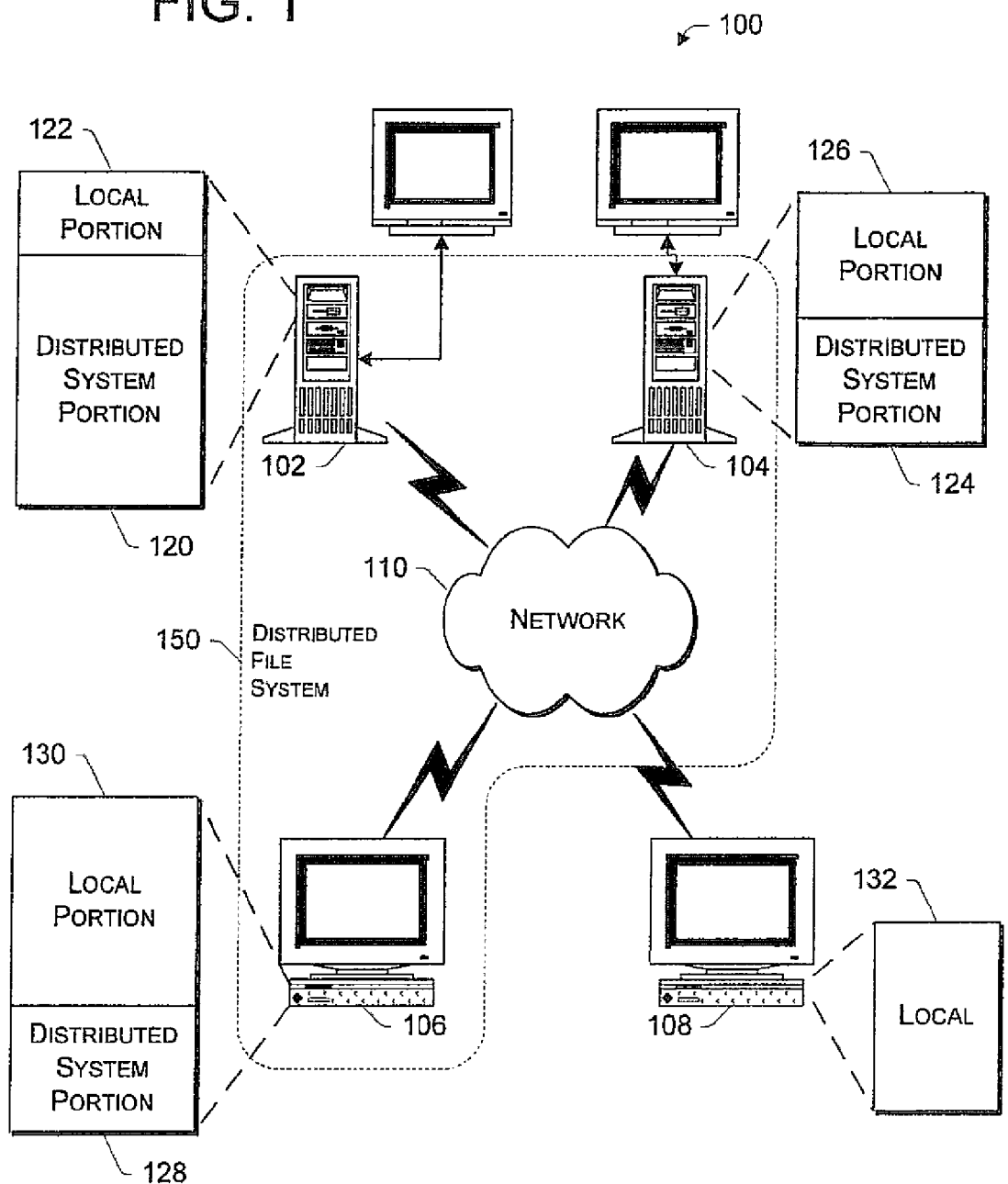
FIG. 1 illustrates an exemplary network environment that supports a serverless distributed file system.

FIG. 1 illustrates an exemplary network environment 100 that supports a serverless distributed file system. Four client computing devices 102, 104, 106, and 108 are coupled together via a data communications network 110. Although four computing devices are illustrated, different numbers (either greater or fewer than four) may be included in network environment 100.

Network 110 represents any of a wide variety of data communications networks. Network 110 may include public portions (e.g., the Internet) as well as private portions (e.g., an internal corporate Local Area Network (LAN)), as well as combinations of public and private portions. Network 110 may be implemented using any one or more of a wide variety of conventional communications media including both wired and wireless media. Any of a wide variety of communications protocols can be used to communicate data via network 110, including both public and proprietary protocols. Examples of such protocols include TCP/IP, IPXISPX, NetBEUI, etc.

Computing devices 102-108 represent any of a wide range of computing devices, and each device may be the same or different. By way of example, devices 102-108 may be desktop computers, laptop computers, handheld or pocket computers, personal digital assistants (PDAs), cellular phones, Internet appliances, consumer electronics devices, gaming consoles, and so forth.

Two or more of devices 102-108 operate to implement a serverless distributed file system. The actual devices participating in the serverless distributed file system can change over time, allowing new devices to be added to the system and other devices to be removed from the system. Each device 102-106 that implements (participates in) the distributed file system has portions of its mass storage device(s) (e.g., hard disk drive) allocated for use as either local storage or distributed storage. The local storage is used for data that the user desires to store on his or her local machine and not in the distributed file system structure. The distributed storage portion is used for data that the user of the device (or another device) desires to store within the distributed file system structure.

In the illustrated example of FIG. 1, certain devices connected to network 110 have one or more mass storage devices that include both a distributed portion and a local portion. The amount allocated to distributed or local storage varies among the devices. For example, device 102 has a larger percentage allocated for a distributed system portion 120 in comparison to the local portion 122; device 104 includes a distributed system portion 124 that is approximately the same size as the local portion 126; and device 106 has a smaller percentage allocated for a distributed system portion 128 in comparison to the local portion 130. The storage separation into multiple portions may occur on a per storage device basis (e.g., one hard drive is designated for use in the distributed system while another is designated solely for local use), and/or within a single storage device (e.g., part of one hard drive may be designated for use in the distributed system while another part is designated for local use). The amount allocated to distributed or local storage may vary over time. Other devices connected to network 110, such as computing device 108, may not implement any of the distributed file system and thus do not have any of their mass storage device(s) allocated for use by the distributed system. Hence, device 108 has only a local portion 132.

A distributed file system 150 operates to store one or more copies of files on different computing devices 102-106. When a new file is created by the user of a computer, he or she has the option of storing the file on the local portion of his or her computing device, or alternatively in the distributed file system. If the file is stored in the distributed file system 150, the file will be stored in the distributed system portion of the mass storage device(s) of one or more of devices 102-106. The user creating the file typically has no ability to control which device 102-106 the file is stored on, nor any knowledge of which device 102-106 the file is stored on. Additionally, replicated copies of the file will typically be saved, allowing the user to subsequently retrieve the file even if one of the computing devices 102-106 on which the file is saved is unavailable (e.g., is powered-down, is malfunctioning, etc.).

The distributed file system 150 is implemented by one or more components on each of the devices 102-106, thereby obviating the need for any centralized server to coordinate the file system. These components operate to determine where particular files are stored, how many copies of the files are created for storage on different devices, and so forth. Exactly which device will store which files depends on numerous factors, including the number of devices in the distributed file system, the storage space allocated to the file system from each of the devices, how many copies of the file are to be saved, a cryptographically secure random number, the number of files already stored on the devices, and so on. Thus, the distributed file system allows the user to create and access files (as well as folders or directories) without any knowledge of exactly which other computing device(s) the file is being stored on.

Distributed file system 150 is designed to be scalable to support large numbers of computers within system 150. Protocols and data structures used by the components on the devices in system 150 are designed so as not to be proportional to the number of computers in the system, thereby allowing them to readily scale to large numbers of computers.

The files stored by the file system are distributed among the various devices 102-106 and stored in encrypted form. When a new file is created, the device on which the file is being created encrypts the file prior to communicating the file to other device(s) for storage. The directory entry (which includes the file name) for a new file is also communicated to other device(s) for storage, which need not be (and typically will not be) the same device(s) on which the encrypted file is stored. Additionally, if a new folder or directory is created, the directory entry (which includes the folder name or directory name) is also communicated to the other device(s) for storage. As used herein, a directory entry refers to any entry that can be added to a file system directory, including both file names and directory (or folder) names.

The distributed file system 150 is designed to prevent unauthorized users from reading data stored on one of the devices 102-106. Thus, a file created by device 102 and stored on device 104 is not readable by the user of device 104 (unless he or she is authorized to do so). In order to implement such security, the contents of files as well as all file and directory names in directory entries are encrypted, and only authorized users are given the decryption key. Thus, although device 104 may store a file created by device 102, if the user of device 104 is not an authorized user of the file, the user of device 104 cannot decrypt (and thus cannot read) either the contents of the file or the file name in its directory entry.

The distributed file system 150 employs a hierarchical storage structure, having one or more namespace roots as well as multiple subtrees under each namespace root. The management of different subtrees can be delegated to different groups of computers, thereby preventing the computers managing a namespace root or a particular subtree(s) from becoming overburdened.

The distributed file system 150 also manages the storage of files and the directory entries corresponding to those files differently. A file being stored in system 150 is replicated and saved on multiple different computers in the system. Additionally, a directory entry is generated for the file and is also saved on multiple different computers in the system. A larger number of directory entry copies are saved than are file copies. In one implementation, the directory entries are stored on computers that are part of a Byzantine-fault-tolerant group, as discussed in more detail below.

The distributed file system 150 also employs a directory and file lock mechanism that allows control over who may read or write directories and files. When used with computers in a Byzantine group, the lock mechanism employed attempts to increase performance by increasing the number of operations that can be performed locally without requiring action by the directory group, as discussed in more detail below.

Every computer 102-106 in distributed file system 150 can have three functions: it can be a client for a local user, it can be a repository for encrypted copies of files stored in the system, and it can be a member of a group of computers that maintain one or more directories.

Generally, when a user on a computer 102-106 opens a file in a given directory, the computer sends a request to a set of computers that collectively manage that directory (called a "Byzantine group" or "directory group") using a Byzantine-fault-tolerant protocol. The Byzantine group grants a file lock to the computer, allowing it to make local updates to the file (if it is a write lock) and to subsequently push those updates back to the Byzantine group. If the computer has accessed this file recently, it will probably have an encrypted copy of the file contents in a local cache, so it need only retrieve the cached copy and decrypt it, after which it can begin reading or writing the file. If it has not accessed the current version of the file recently, the computer retrieves an encrypted copy of the file from one of the computers that stores the file. The information about which computers hold current copies is provided by the Byzantine group along with the lock grant; if one or more of the file-storage computers are down, the computer retrieves the file from a different one. The Byzantine group also provides a cryptographic hash of the file contents that the computer uses to validate the file it fetches.

File Encryption

The files are encrypted using a technology known as "convergent encryption". Convergent encryption has the following two properties. First, if two or more encryptable objects are identical, then even if different encryption keys are used to encrypt them to provide individual cipher objects, one does not need to have access to any of the encryption keys to determine from an examination of the cipher objects that the encryptable objects are identical. Second, if two or more encryptable objects are identical but are encrypted with different encryption keys, the total space that is required to store all of the cipher objects is proportional to the space that is required to store a single encryptable object, plus a constant amount of storage for each distinct encryption key.

Generally, according to convergent encryption, a file F (or any other type of encryptable object) is initially hashed using a one-way hashing function h (e.g., SHA, MD5, etc.) to produce a hash value h(F). The file F is then encrypted using a symmetric cipher (e.g., RC4, RC2, etc.) with the hash value as the key, or $E_{h(F)}(F)$. Next, read access control entries are created for each authorized user who is granted read access to the encrypted file. Write access control is governed by the directory server that stores the directory entry for the file. The read access control entries are formed by encrypting the file's hash value h(F) with any number of keys K1, K2, ... K., to yield $E_{K1}(h(F))$, EK2(h(F)), ..., $E_{K1T1}(h(F))$. In one implementation, each key K is the users public key of a public/private key pair for an asymmetric cipher (e.g., RSA).

With convergent encryption, one encrypted version of the file is stored and replicated among the serverless distributed file system 150. Along with the encrypted version of the file is stored one or more access control entries depending upon the number of authorized users who have access. Thus, a file in the distributed file system 150 has the following structure:

$$[Eh(F)(F), <_{EK\ 1(h(F))}>, <Ex2(h(F))>, \ldots, <EKm(h(F))>]$$

One advantage of convergent encryption is that the encrypted file can be evaluated by the file system to determine whether it is identical to another file without resorting to any decryption (and hence, without knowledge of any encryption keys). Unwanted duplicative files can be removed by adding the authorized user(s) access control entries to the remaining file. Another advantage is that the access control entries are very small in size, on the order of bytes as compared to possibly gigabytes for the encrypted file. As a result, the amount of overhead information that is stored in each file is small. This enables the property that the total space used to store the file is proportional to the space that is required to store a single encrypted file, plus a constant amount of storage for each additional authorized reader of the file.

For more information on convergent encryption, the reader is directed to co-pending U.S. patent application Ser. No. 091565,821, entitled "Encryption Systems and Methods for Identifying and Coalescing Identical Objects Encrypted with Different Keys", which was filed May 5, 2000, in the names of Douceur et al., and is commonly assigned to Microsoft Corporation. This application is hereby incorporated by reference.

Directory Entry Encryption

The file and directory names within directory entries are encrypted using a process referred to as "exclusive encryption". Exclusive encryption allows the file and directory names within directory entries to be stored in an encrypted form, thereby preventing unauthorized users from improperly gaining any information based on the name of a file or directory. Additionally, exclusive encryption has the following three properties. First, no two encrypted entries in a directory will decrypt to the same name. Second, all encrypted entries in a directory decrypt to syntactically legal names. Third, the directory group that maintains the directory does not have access to the plaintext names of the entries. Thus, file system 150 is able to ensure both that no two entries in a directory are encryptions of the same name and that all entries in a directory are encryptions of syntactically legal names, while at the same time ensuring that the device maintaining the directory does not have access to the plaintext names of the entries.

Generally, according to exclusive encryption, a plaintext name (the file or directory name within the directory entry) is mapped to a new name. The mapped name is optionally decasified into a decasified (case-insensitive) name and corresponding case information, allowing duplicate name detection to be case-insensitive. The mapped (and optionally decasified) name is then encoded and encrypted. This encrypted name (and optionally accompanying case information) are forwarded to the directory group that is responsible for managing the directory entry (e.g., based on pathname, as discussed in more detail below).

For more information on exclusive encryption, the reader is directed to co-pending U.S. patent application Ser. No. 091764,962, entitled "Exclusive Encryption for a Secure Directory Service", which was filed Jan. 17, 2001, in the names of Douceur et al., and is commonly assigned to Microsoft Corporation. This application is hereby incorporated by reference.

File Format

The file format for serverless distributed file system 150 of FIG. 1 is composed of two parts: a primary data stream and a metadata stream. The primary data stream contains a file that is divided into multiple blocks. Each block is encrypted using a symmetric cipher (e.g., RC4) and a hash of the block as the encryption key. The metadata stream contains a header, a structure for indexing the encrypted blocks in the primary data stream, and some user information.

The indexing tree structure defines leaf nodes for each of the blocks. Each leaf node consists of an access value used for decryption of the associated block and a verification value used to verify the encrypted block independently of other blocks. In one implementation, the access value is formed by hashing the file block and encrypting the resultant hash value using a symmetric cipher and a randomly generated key. The key is then encrypted using an asymmetric cipher (e.g., RSA) and the user's public key as the encryption key. The verification value is formed by hashing the associated encrypted block using a one-way hash function (e.g., SHA).

Depending on the size of the file, the indexing structure may include intermediate nodes formed by grouping the leaf nodes into tree blocks and computing hash values of each tree block. These intermediate nodes can again be segmented into blocks and each block hashed to form the next nodes. This can be repeated as many times as desired until reaching a root node. The root node is then hashed, and the hash value is used along with the metadata header and user information to produce a verification value for the entire file. In one implementation, the whole-file verification value is signed with a user's signature. Alternatively, a file may be constructed without such signatures.

The file format supports verification of individual file blocks without knowledge of the randomly generated key or any user keys. To verify a block of the file, the file system optionally evaluates the signature on whole file verification value (if one exists), checks that the whole-file verification value matches the hash of the root block, metadata header and user information and then traverses the tree to the appropriate leaf node associated with a target block to be verified. The file system hashes the target block and if the hash matches the access value contained in the leaf node, the block is authentic.

The file format further supports reading from and writing to individual blocks without interfering with other blocks. The file format is also conducive for sparse files that have vast areas of non-data.

For more information on the file format, the reader is directed to co-pending U.S. patent application Ser. No. 091814,259, entitled "On-Disk File Format for a Serverless Distributed File System", which was filed Mar. 21, 2001, in the names of Bolosky et al., and is commonly assigned to Microsoft Corporation. This application is hereby incorporated by reference.

Computing Device Architecture

Figure 2:
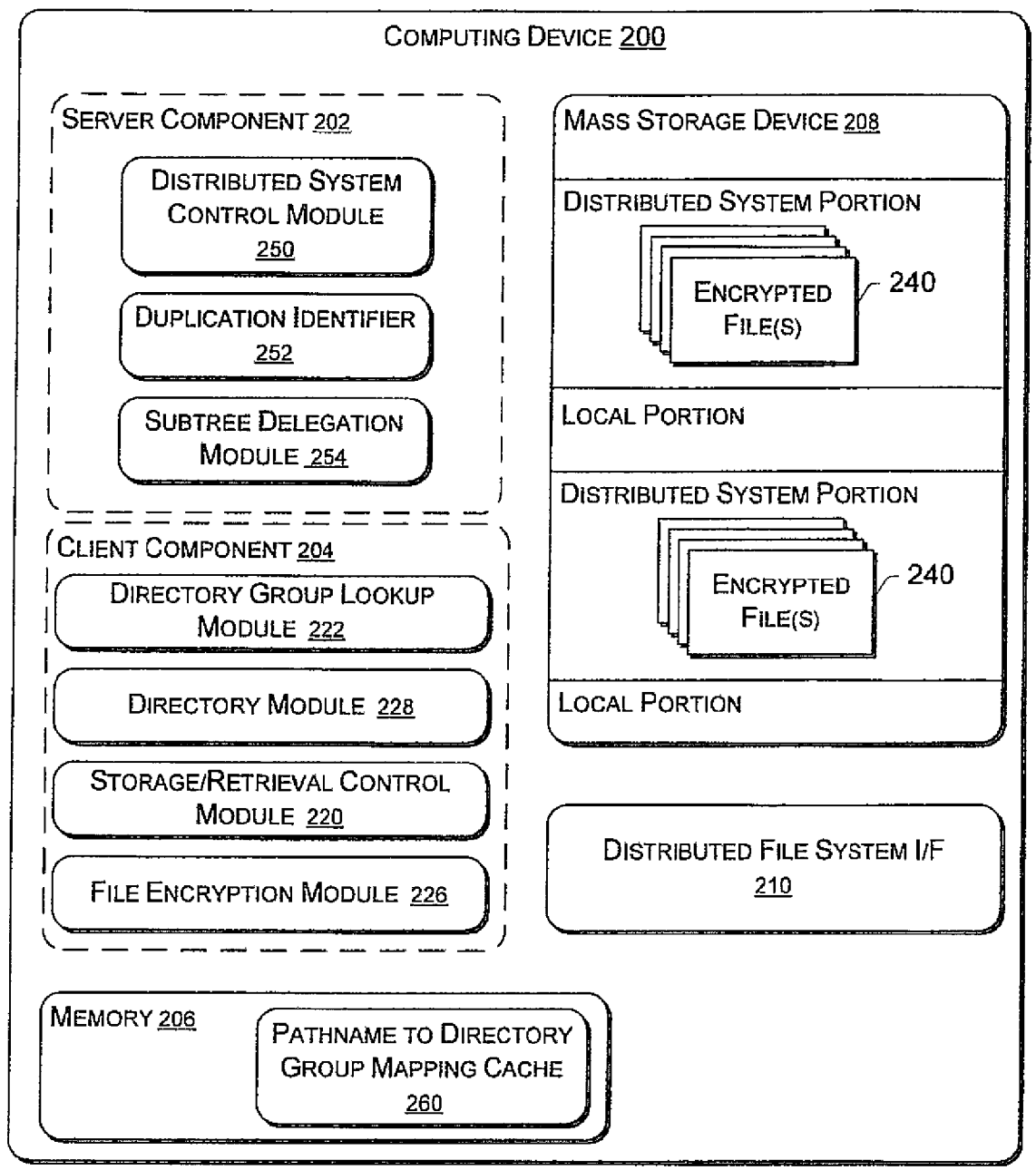
FIG. 2 illustrates logical components of an exemplary computing device that is representative of any one of the devices of FIG. 1 that participate in the distributed file system.

FIG. 2 illustrates logical components of an exemplary computing device 200 that is representative of any one of the devices 102-106 of FIG. I that participate in the distributed file system 150. Computing device 200 includes a server component 202, a client component 204, a memory 206, a mass storage device 208, and a distributed file system interface 210. Computing device 200 also typically includes additional components (e.g., a processor), however these additional components have not been shown in FIG. 2 so as not to clutter the drawings. A more general description of a computer architecture with various hardware and software components is described below with reference to FIG. 3.

Memory 206 can be any of a wide variety of conventional volatile and/or nonvolatile memories, such as RAM, ROM, Flash memory, and so on. Mass storage device 208 can be any of a wide variety of conventional nonvolatile storage devices, such as a magnetic disk, optical disk, Flash memory, and so forth. Mass storage device 208 is partitioned into a distributed system portion and a local portion. Although only one mass storage device 208 is illustrated in FIG. 2, computing device 200 may include multiple storage devices 208 (of different types, or alternatively all of the same type).

Computing device 200 is intended to be used in a serverless distributed file system, and as such includes both a server component 202 and client component 204. Server component 202 handles requests when device 200 is responding to a request involving a file or directory entry stored (or to be stored) in storage device 208, while client component 204 handles the issuance of requests by device 200 for files or directories stored (or to be stored) in the distributed file system. Client component 204 and server component 202 operate independently of one another. Thus, situations can arise where the serverless distributed file system 150 causes files being stored by client component 204 to be stored in mass storage device 208 by server component 202.

Client component 204 includes a storage and retrieval control module 220, which along with interface 210, manages access to the serverless distributed file system 150 for the creation, storage, retrieval, reading, writing, modifying, and verifying of files and directories on behalf of computing device 150. Control module 220 uses a directory group lookup module 222 to identify a directory group that is responsible for managing a particular file or directory, a file encryption module 226 to encrypt files, and a directory encryption module 228 to encrypt file and directory names in directory entries. The operation of these modules is discussed in more detail below.

The server component 202 includes a distributed system control module 250, a duplication identifier 252, and a subtree delegation module 254. Distributed system control module 250 manages access to the encrypted files 240. It communicates with mass storage device 208 to store and retrieve encrypted files 240. Distributed system control module 250 also maintains a record of the directory entries (not shown) in memory 206 and/or mass storage device 208 that are stored at computing device 200 (or alternatively that are stored elsewhere in the serverless distributed file system). Subtree delegation module 254 operates to delegate subtrees to other directory groups, as discussed in more detail below.

Duplication identifier 252 helps identify identical encrypted files in the distributed file system. When the duplication identifier 252 finds a duplication that is not an intentional replication for fault tolerant purposes, the duplication identifier 252 notifies the control module 250, which then eliminates the duplicated file and adds the access control entries to the eliminated file to the remaining file.

Figure 3:
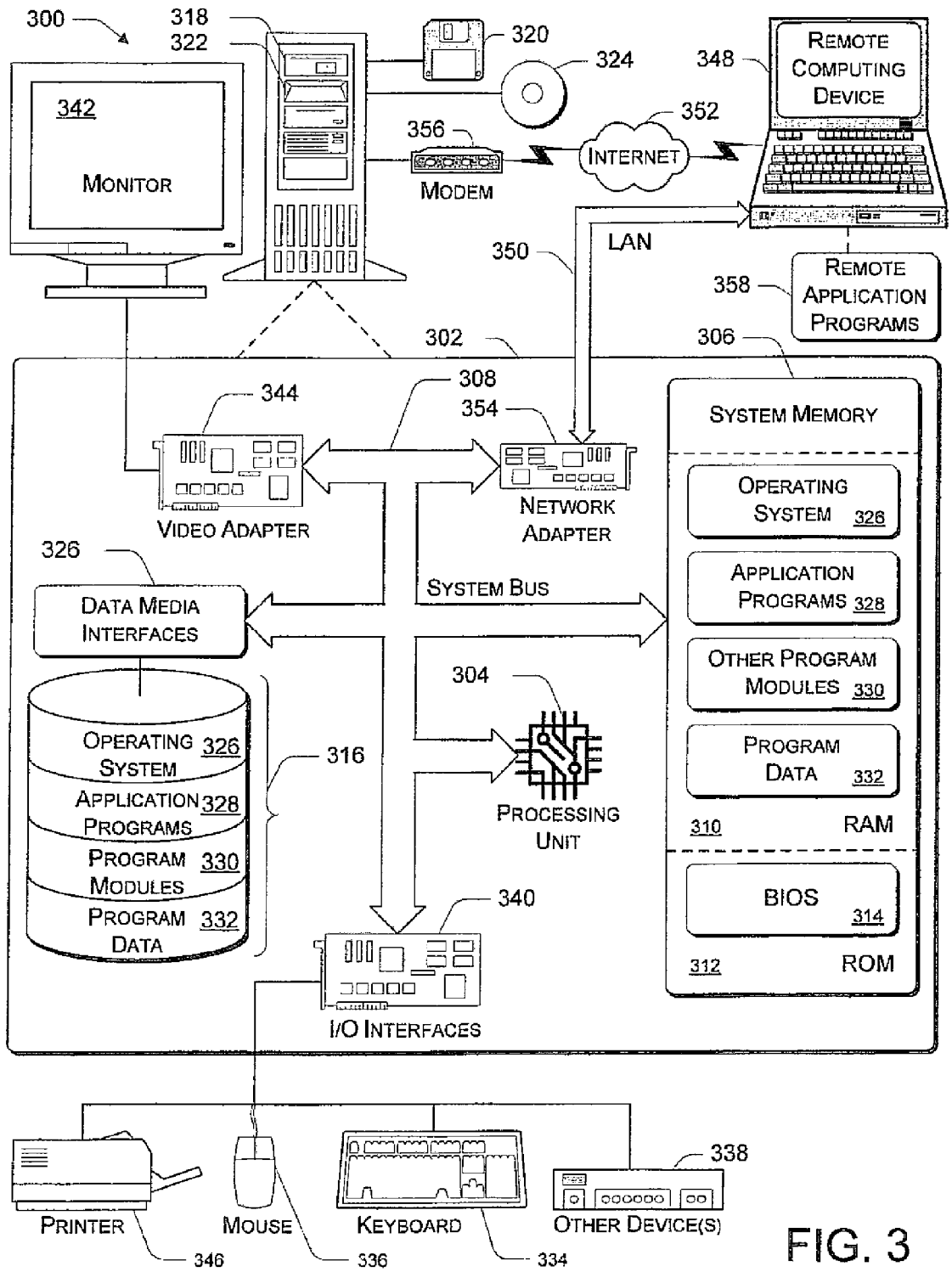
FIG. 3 illustrates a more general computer environment which is used to implement the distributed file system of FIG. 1.

FIG. 3 illustrates a more general computer environment 300, which is used to implement the distributed file system. The computer environment 300 is only one example of a computing environment and is not intended to suggest any limitation as to the scope of use or functionality of the computer and network architectures. Neither should the computer environment 300 be interpreted as having any requirement regarding the inclusion (or exclusion) of any components or the coupling or combination of components illustrated in the exemplary computer environment 300.

Computer environment 300 includes a general-purpose computing device in the form of a computer 302. The components of computer 302 can include, by are not limited to, one or more processors or processing units 304, a system memory 306, and a system bus 308 that couples various system components including the processor 304 to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 302 typically includes a variety of computer readable media. Such media can be any available media that is accessible by computer 302 and includes both volatile and non-volatile media, removable and non-removable media.

The system memory 306 includes computer readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/nonvolatile computer storage media. By way of example, FIG. 3 illustrates a had disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The had disk drive 316, magnetic disk drive 318, and optical disk drive 322 are each connected to the system bus 308 by one or more data media interfaces 326. Alternatively, the had disk drive 316, magnetic disk drive 318, and optical disk drive 322 can be connected to the system bus 308 by one or more interfaces (not shown).

The disk drives and their associated computer-readable media provide non-volatile storage of computer readable instructions, data structures, program modules, and other data for computer 302. Although the example illustrates a had disk 316, a removable magnetic disk 320, and a removable optical disk 324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the had disk 316, magnetic disk 320, optical disk 324, ROM 312, and/or RAM 310, including by way of example, an operating system 326, one or more application programs 328, other program modules 330, and program data 332. Each of such operating system 326, one or more application programs 328, other program modules 330, and program data 332 (or some combination thereof) may implement all or part of the resident components that support the distributed file system.

A user can enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 404 via input/output interfaces 340 that are coupled to the system bus 308, but may be connected by other interface and bus structures, such as a parallel port, game port, or a universal serial bus (USB).

A monitor 342 or other type of display device can also be connected to the system bus 308 via an interface, such as a video adapter 344. In addition to the monitor 342, other output peripheral devices can include components such as speakers (not shown) and a printer 346 which can be connected to computer 302 via the input/output interfaces 340.

Computer 302 can operate in a networked environment using logical connections to one or more remote computers, such as a remote computing device 348. By way of example, the remote computing device 348 can be a personal computer, portable computer, a server, a router, a network computer, a peer device or other common network node, and the like. The remote computing device 348 is illustrated as a portable computer that can include many or all of the elements and features described herein relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which can be internal or external to computer 302, can be connected to the system bus 308 via the input/output interfaces 340 or other appropriate mechanisms. It is to be appreciated that the illustrated network connections are exemplary and that other means of establishing communication link(s) between the computers 302 and 348 can be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components such as the operating system are illustrated herein as discrete blocks, although it is recognized that such programs and components reside at various times in different storage components of the computing device 302, and are executed by the data processor(s) of the computer.

An implementation of the distributed file system 150 may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of the file format for the encrypted files may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Hierarchical Storage Structure

Figure 4:
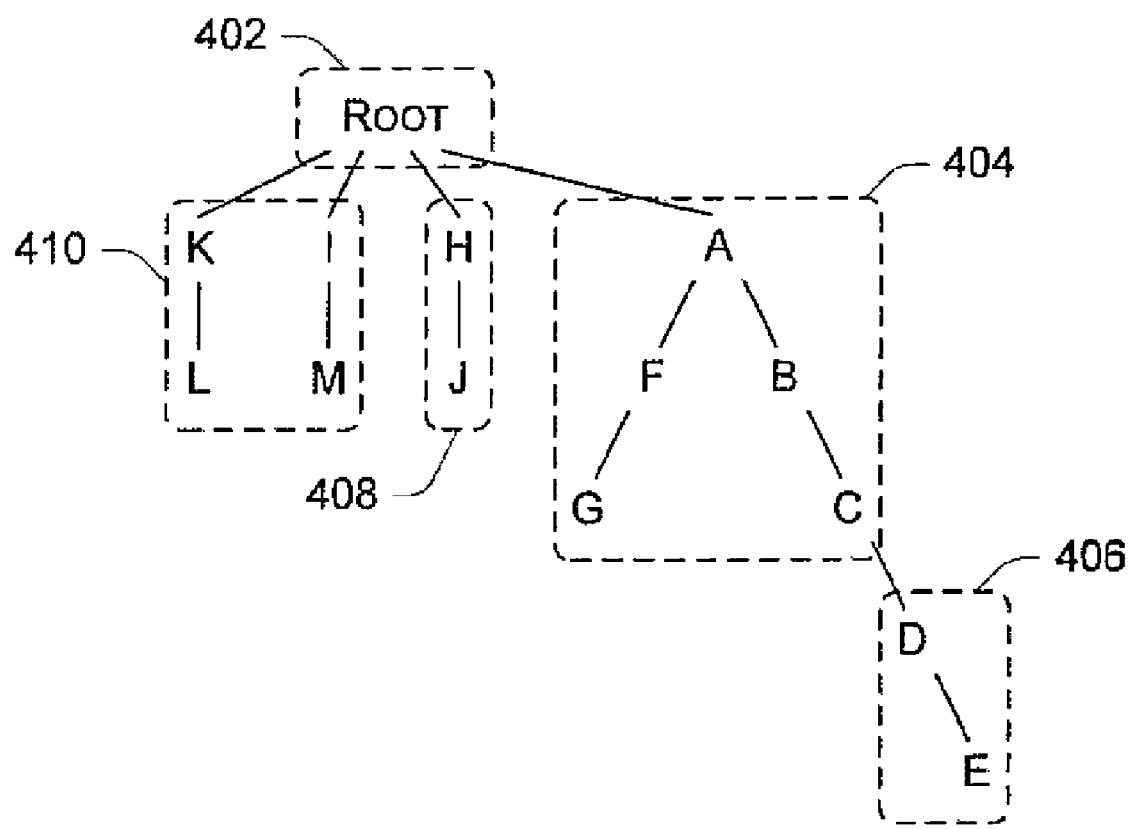
FIG. 4 illustrates an exemplary hierarchical namespace including a namespace root having multiple subtrees.

Distributed file system 150 employs a hierarchical file storage structure including one or more namespace roots each capable of supporting one or more subtrees of directories or folders, and with each subtree being capable of supporting one or more additional-subtrees. A directory can be viewed as a simulated file folder, being capable of holding zero or more files and/or zero or more other directories. A subtree refers to one or more directories and includes a root (it may also include a namespace root), and has the property that the path from the subtree root to all members of the subtree is within the subtree itself. FIG. 4 illustrates an exemplary hierarchical namespace 400 including a namespace root having multiple subtrees including directories A, B, C, D, E, F, G, H, J, I, M, K, and L. Although many more directories will typically be included in subtrees of a namespace root, only a few have been illustrated in FIG. 4 for ease of explanation.

Each subtree is managed by a group of one or more computers referred to as a directory group. Although discussed herein primarily as directory groups managing subtrees, alternatively one or more directory groups may manage an arbitrary set of directories within the namespace. One or more modules of the computer are responsible for implementing directory services to manage the subtree(s) it is assigned, such as control module 250 of FIG. 2. In one implementation, each directory group is a Byzantine-fault-tolerant group (or simply referred to as a Byzantine group), as discussed in more detail below. However, directory groups need not be Byzantine-fault-tolerant groups, and other groupings can be used.

The solid lines in FIG. 4 illustrate relationships between directories, identifying which directories are sub-directories of which other directories. For example, directory C is a sub-directory of directory B. A directory can also be referred to as the "parent" directory of any of its sub-directories. For example, directory B can be referred to as the parent directory of directory C.

Each dashed box in FIG. 4 illustrates a directory group that manages the directories included within the particular dashed line. Thus, in the example namespace 400, the root namespace is managed by a directory group 402, directories A, B, C, F, and G are managed by a directory group 404, directories D and E are managed by a directory group 406, directories H and J are managed by a directory group 408, and directories K, I, L, and M are managed by a directory group 410.

A directory group managing a particular directory or namespace is responsible for maintaining a directory entry for each file stored in that directory, as well as a directory entry for each sub-directory within the directory. Each directory entry for a file identifies one or more computers in the distributed file system 150 where the file is stored. Each directory entry for a sub-directory identifies the directory group responsible for managing that sub-directory. Directory entries may also contain additional information, such as: creation, modification and access time stamps; read and write access control lists; the set of replica locations; the size of the file; and so forth.

Each directory group is responsible for managing a namespace root and/or one or more subtrees within the namespace. Each directory group is further able to identify one or more additional subtrees and delegate management responsibility for those additional subtrees to another directory group. For example, directories D and E may have originally been managed by directory group 404, but subsequently delegated to directory group 406.

A directory group can decide at any time to delegate a subtree to another directory group. In one implementation, this decision is based on workload, and the directory group decides to delegate a subtree when the group determines that it is becoming overloaded. Various factors can be used by a group to determine when it is becoming overloaded, and in one exemplary implementation each directory group tries to manage a subtree of size approximately equal to the mean count of expected directories per machine (e.g., on the order of 10,000).

The directory group to which the subtree is to be delegated can be determined in a variety of manners. In one implementation, the directory group performing the delegation selects randomly from the computers in distributed file system 150 that it is aware of, and uses those selected computers as the new directory group to which the subtree is to be delegated. Various other factors may weigh into the selection process (e.g., not selecting those computers that have low availability, not selecting those computers that have recently delegated a subtree, etc.).

A directory group is able to delegate a particular subtree by generating a delegation certificate that is digitally signed by one or more members of the directory group. In situations where multiple members sign a delegation certificate, the signature process can take various forms. In one implementation, each member signs its own copy of the delegation certificate. In another implementation, the delegation certificate is recursively signed (e.g., the certificate is signed by one member, and then the digitally signed certificate is signed by another member, etc.). The order in which different members recursively sign the certificate does not matter, so long as the order is known to the verifier when verifying the digital signature (e.g., the verifier may be pre-programmed with the order of signature, or information identifying the order may be included in the certificate). The following illustrates an exemplary certificate recursively signed by four signers:

$$\sigma S4(\sigma S3(\sigma S2(\sigma S_{E}(^{DC}))))$$

where DC represents the delegation certificate being digitally signed, and $\sigma$siO indicates that the contents of O have been digitally signed by signer i.

In one implementation, the number of members (computers) in a directory group is dependent on the number of faulty computers that the designer desires to be able to tolerate. As used herein, a faulty computer refers to a computer that is either inaccessible (e.g., the computer has been powered off or is malfunctioning) or that has been corrupted (e.g., a malicious user or program has gained access to the computer and is able to respond to queries inappropriately, such as by not giving proper response or giving improper data). In one specific example, in order to tolerate f faulty computers, a directory group includes 3f+1 computers. Additionally, in this example, at least f+1 computers digitally sign the delegation certificate.

Each namespace root has associated with it a certificate that is obtained from a certification authority (CA). The certification authority is a trusted authority that verifies the creation of the namespace. Each delegation certificate associated with a subtree includes a certificate chain that traces from the current subtree back up through zero or more other subtrees to the namespace root certificate signed by the CA. Thus, each delegation certificate has associated with it multiple certificates that prove it is the authorized directory group for managing the subtree (by establishing a certificate chain back to the certificate signed by the CA).

The delegation certificate can include different components, and in one implementation the delegation certificate includes: (1) an identification of the path being delegated that is below the root of the subtree that is being managed by the directory group performing the delegation; (2) an identification of the root of the subtree delegated to the directory group performing the delegation; (3) an identification of the subtree being delegated; and (4) an identification of the members of the group to which the subtree is being delegated. The identifications of subtrees and path members can vary, and can be the actual directory names (e.g., the names of directories A, B, C, D, etc.) or alternatively identification numbers (e.g., Globally Unique Identifiers (GUIDs)). Identification numbers can be used to avoid the need to re-create delegation certificates in the event that a directory name is changed.

An example of delegation certificates can be seen with reference to FIG. 4. Directory group 402 obtains a certificate from a CA certifying that group 402 has authority to manage the namespace root. This certificate takes the following form:

$$\sigma_{OurCA}(\text{"Root"}, \text{GUIDRoot}, _{DG402}) \quad (1)$$

where $\sigma$OUECA indicates that the certificate has been signed by the CA "OurCA", "Root" is the name of the namespace root, $\text{GUID}_{Root}$ is a globally unique identifier for the namespace root, and $DG_{402}$ represents the names (or other identifiers) of the members of directory group 402.

When directory group 402 decides to delegate the subtree beginning with directory A to directory group 404, directory group 402 generates a delegation certificate to be passed to the members of directory group 404. This delegation certificate includes certificate (1) above, as well as the following certificate:

$$\sigma_{DG402}(^{GUID}Root^{/A}, \text{GUIDA}, ^{DG}404) \quad (2)$$

where $\sigma$DG402 indicates that the certificate has been signed by members of directory group 402, $\text{GUID}_{Root}/A$ is the GUID of the subtree's root delegated to directory group 402 ($\text{GUID}_{Root}$) along with the path being delegated to directory group 404 (/A), $\text{GUID}_A$ is a globally unique identifier of the subtree being delegated (that is, the subtree beginning with directory A), and $DG_{404}$ represents the names (or other identifiers) of the members of directory group 404.

Similarly, when directory group 404 decides to delegate the subtree beginning with directory D to directory group 406, directory group 404 generates a delegation certificate to be passed to the members of directory group 406. This delegation certificate includes certificates (1) and (2) above, as well as the following certificate:

$$\sigma_{DG404}(GUIDA/B/CID, \text{GUID}_D, DG406) \quad (3)$$

where $\sigma$DG404 indicates that the certificate has been signed by members of directory group 404, G U I D ABIC/D is the GUID of the subtree's root delegated to directory group 404 ($\text{GUID}_A$) along with the path being delegated to directory group 406 (B/CID), $\text{GUID}_D$ is a globally unique identifier of the subtree being delegated (that is, the subtree beginning with directory D), and DG406 represents the names (or other identifiers) of the members of directory group 406.

In the illustrated example, delegation certificates are issued at delegation points rather than for each directory within a particular subtree. For example, a delegation certificate is issued for A (the top directory in the subtree), but not for IAB or IAB/C.

In FIG. 4, each computer in distributed file system 150 maintains a local cache (e.g., cache 260 of FIG. 2) mapping some subset of the pathnames in the name space to the directory group that manages that pathname. For example, a particular computer's cache may include a mapping of each of pathnames IA,/AB,/AB/C, IAIF, and /AIFIG to directory group 404. Different computers can have different mappings in their caches, but each typically includes at least a mapping of the namespace root to its managing directory group (directory group 402).

Maintaining a pathname to managing directory group mapping allows a computer to perform at least some of the directory group lookup process itself locally rather than always requiring accessing the directory group managing the namespace root (and perhaps other directory groups). For example, assume that a computer desires to access a file called "foo.txt" with the pathname IAB1foo.txt, and that the computer has in its local cache the mapping of the pathnames for directory group 404. In this example, the computer can readily identify from its own local cache the members of directory group 404 that manage the files in directory B, and thus the file foo.txt. Thus, the determination of which computers to access to determine the location of the file "foo.txt" (that is, which computers manage the directory entries for pathname/AB) is made by the computer based on the information in its cache, without having to access either directory group 402 or 404 to make the determination.

If a computer does not have enough information in its local cache to map the entire pathname to a directory group, the computer finds the mapping for the longest prefix in the pathname that exists in its cache. The computer then accesses the directory group that manages the last directory in that longest prefix to determine the directory groups managing as much of the rest of the pathname and their delegation certificates as possible. This process of accessing directory groups and obtaining delegation certificates continues until the proper mapping is found.

For example, assume that a computer desires to access a file called "foo2.txt" with the pathname IA/B/CIDIfoo2.txt, and that the computer has in its local cache the mapping of the pathnames for directory group 404 but not for directory group 406. The computer looks at the pathname and finds the mapping for the longest prefix in its cache that is in the pathname (/A/B/C) and accesses the directory group responsible for managing that directory, which is directory group 404. The computer queries a member of directory group 404 for the delegation certificate(s) for the relevant subtrees for pathname /A/B/C/D/foo2.txt, which is the delegation certificate for directory group 406. The member of directory group 404 returns this delegation certificate to the querying computer, which in turn can verify the delegation certificate (e.g., based on the public key(s) of the signing computer(s)). The received delegation certificate identifies the directory group that is responsible for managing the directory/D, so the computer knows to access that directory group in order to determine where to locate the file "foo2.txt". Thus, although the determination of which computers to access to determine the location of the file "foo2.txt" involved accessing a member of directory group 404, no access to a member of directory group 402 was required to make the determination.

Directory and File Replication and Storage

Distributed file system 150 of FIG. 1 manages the storage of directory entries and the files corresponding to those entries differently. A file being stored in system 150 is replicated and saved to multiple different computers in system 150. Additionally, a directory entry is generated for the file and is also saved to multiple different computers in system 150 that are part of a Byzantine-fault-tolerant group. The directory entry is saved to more computers than the file is saved to, as discussed in additional detail below.

The different treatment for storage of files and directory entries described herein can be used in conjunction with the hierarchical storage structure discussed above. However, the different treatment for storage of files and directory entries described herein can also be used in systems that do not employ a hierarchical storage structure.

A Byzantine-fault-tolerant group is a group of computers that can be used to store information and/or perform other actions even though a certain number of those computers are faulty (compromised or otherwise unavailable). A computer can be compromised in a variety of different manners, such as a malicious user operating the computer, a malicious program running on the computer, etc. Any type of behavior can be observed from a compromised computer, such as refusing to respond to requests, intentionally responding to requests with incorrect or garbage information, etc. The Byzantine-fault-tolerant group is able to accurately store information and/or perform other actions despite the presence of such compromised computers. Byzantine groups are well-known to those skilled in the art, and thus will not be discussed further except as they pertain to the present invention.

It is known to those skilled in the art that for certain types of computations in order to be able to operate correctly despite a number of failed computers f (a failed computer may be compromised or otherwise unavailable, such as powered down), the Byzantine-fault-tolerant group should include at least 3f+1 computers. In distributed file system 150, the directory entries are stored on the 3f+1 computers of a Byzantine-fault-tolerant group, while the file itself is stored on f+1 computers (which may be one or more of the same computers on which the directory entry is stored).

Figure 5:
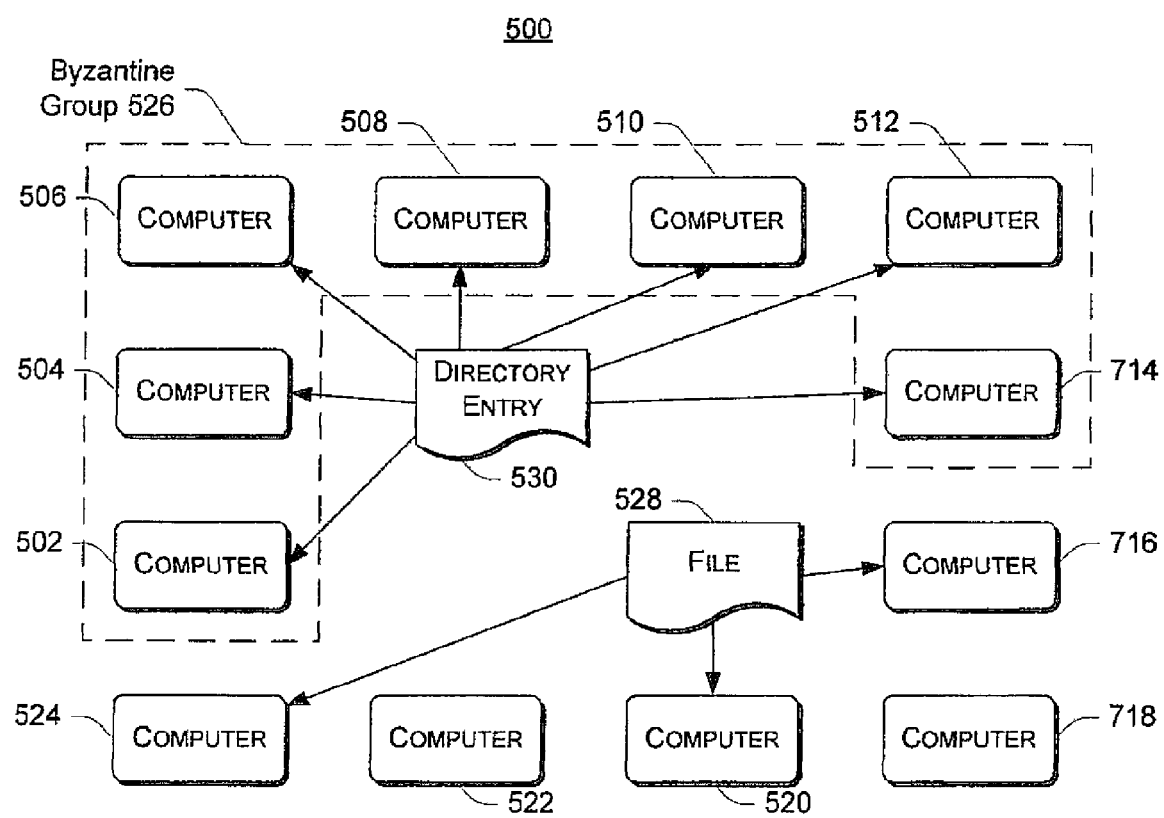
FIG. 5 illustrates the exemplary storage of a file and corresponding directory entry in a serverless distributed file system.

FIG. 5 illustrates the exemplary storage of a file and corresponding directory entry in a serverless distributed file system. File system 500 (e.g., a serverless distributed file system 150 of FIG. 1) includes twelve computers 502, 504, 506, 508, 510, 512, 514, 516, 518, 520, 522, and 524. Assuming that the designer of system 500 desires to be able to tolerate two computer failures, the Byzantine-fault-tolerant group should include at least seven ((3·2)+1) computers. Byzantine group 526 is illustrated including computers 502-514.

When a file 528 is to be stored in file system 500, a corresponding directory entry 530 is stored by the computers in the appropriate directory group (the directory group responsible for managing the directory the file is stored in, based on the pathname of file 528). The directory group in FIG. 5 for directory entry 530 is Byzantine group 526, so the directory entry 530 is stored on each correctly functioning computer 502-514 in Byzantine group 526. Thus, directory entry 530 is stored on up to seven different computers. File 528, on the other hand, is replicated and stored on each of three computers (computers 516, 520, and 524). As illustrated, the computers on which file 528 are stored need not be, and typically are not, in Byzantine group 526 (although optionally one or more of the computers on which file 528 are stored could be in Byzantine group 526).

Each directory entry includes the name of the corresponding file, an identification of the computers that the file is stored at, and file verification data that allows the contents of the file to be verified as corresponding to the directory entry. The file verification data can take a variety of different forms, and in one implementation is a hash value generated by applying a cryptographically secure hash function to the file, such as MD5 (Message Digest 5), SHA-1 (Secure Hash Algorithm-1), etc. When a file is retrieved from storage, the retrieving computer can re-generate the hash value and compare it to the hash value in the directory entry to verify that the computer received the correct file. In another implementation, the file verification data is a combination of: a file identification number (e.g., a unique identifier of the file), a file version number, and the name of the user whose signature is on the file.

Figure 6:
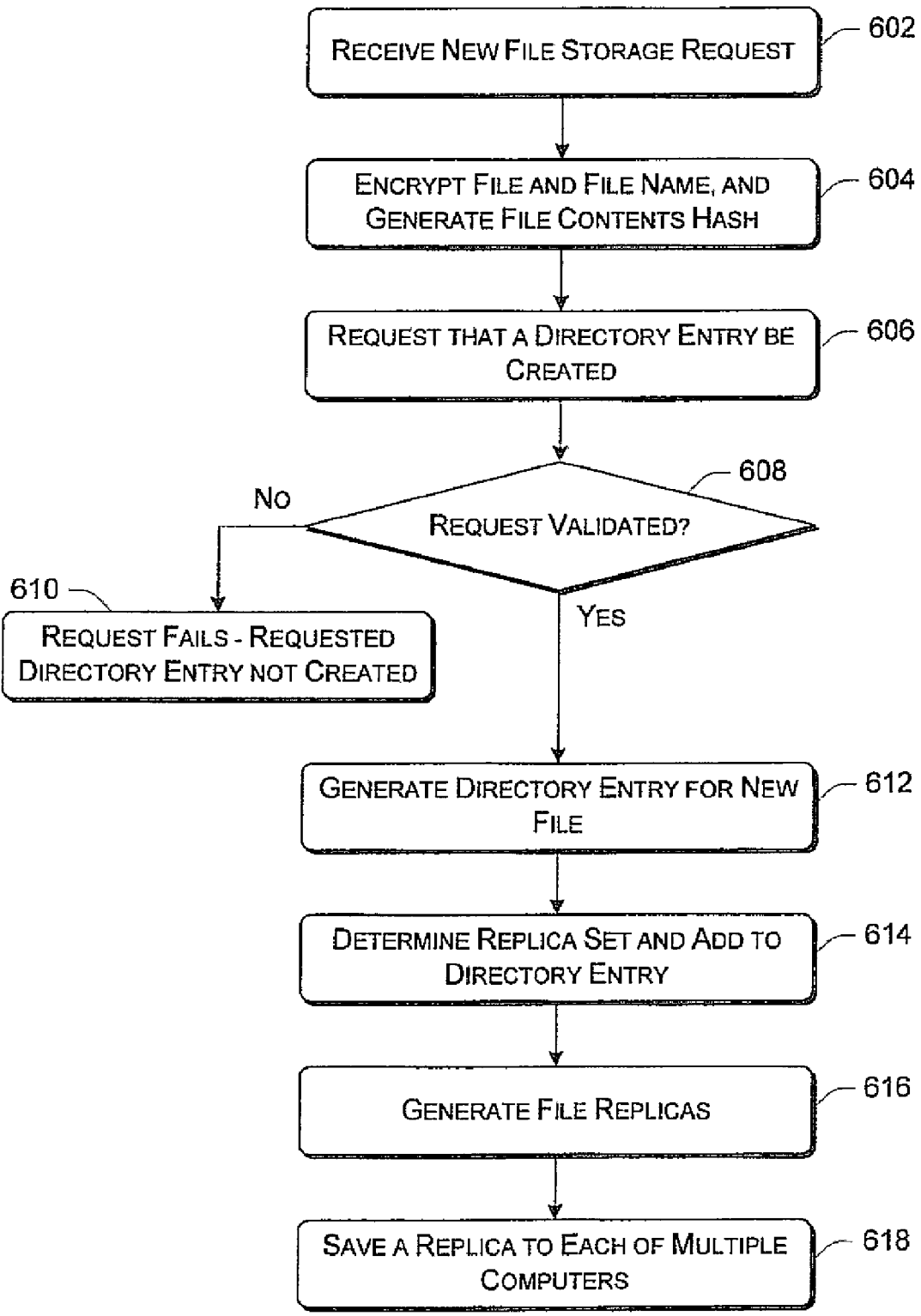
FIG. 6 is a flowchart illustrating an exemplary process for storing a file in a serverless distributed file system.

FIG. 6 is a flowchart illustrating an exemplary process for storing a file in a serverless distributed file system. Initially, a new file storage request is received at a client computing device (act 602). The client encrypts the file and the file name and generates the file contents hash (act 604). The client sends the encrypted file name and file contents hash to the appropriate Byzantine-fault-tolerant directory group along with a request to create a directory entry (act 606). The directory group validates the request (act 608), such as by verifying that the file name does not conflict with an existing name and that the client has permission to do what it is requesting to do. If the request is not validated then the request fails (act 610). However, if the request is validated, then the directory group generates a directory entry for the new file (act 612). The directory group also determines the replica set for the new file and adds the replica set to the newly generated directory entry (act 614). Replicas of the file are also generated (act 616), and saved to multiple computers in the file system (act 618).

By storing the directory entries in a Byzantine group, and including file verification data in the entries, fault tolerance is maintained (up to f failures). However, storage space requirements and Byzantine operations are reduced by storing files separately from directories and not using Byzantine operations to access them. For example, directory entries may be on the order of one hundred bytes, whereas the file itself may be on the order of thousands or even billions of bytes.

Directory and File Lock Mechanism

Each object (e.g., directory and file) in distributed file system 150 of FIG. 1 has associated with it a set of leased locks. These locks are used to determine, based on the type of operation an application desires to perform, whether the application can open a directory or file to perform that operation. A lock can be viewed as a lease with a particular time span that depends on the type of lock and the level of contention. For example, the time span on a write lock may be a few minutes, while the time span on a read lock may be as long as a few days. When an application desires to perform an operation(s) on an object, the client computer on which the application is executing looks to see if it already has the necessary locks to perform the operation(s). If not, it requests the appropriate lock(s) from the directory group responsible for managing that object. Once the application has finished performing the desired operation, it can optionally release the lock(s) it acquired or keep it until it automatically expires or is recalled by the managing directory group.

For a particular directory, the Byzantine-fault-tolerant group that implements the directory controls the locks for: all files in the directory; the names of any subdirectories of the directory; and the right to delete the directory itself. The lock mechanism attempts to grant broad (coarse granularity) locks on appropriate files and directories to a requesting client computer so that the client computer can process many reads and/or updates with a single Byzantine lock acquisition rather than requiring multiple Byzantine messages for lock acquisitions.

In the illustrated example, the lock mechanism employs ten different locks: Read, Write, Open Read, Open Write, Open Delete, Not Shared Read, Not Shared Write, Not Shared Delete, Insert, and Exclusive. The Read and Write locks are used to control access to the data in the objects (e.g., the contents of a file). The Open Read, Open Write, Open Delete, Not Shared Read, Not Shared Write, and Not Shared Delete locks are used to control the opening of the objects. The Insert and Exclusive locks are special-use locks. These ten locks are discussed in more detail below. Depending on the operation an application desires to perform, the appropriate ones of these locks are requested by the application.

Read Lock. The Read lock is requested by an application so that the application can read the associated file. The Read lock, in conjunction with the Write lock, allows the directory group to keep data in the file consistent.

Write Lock. The Write lock is requested by an application so that the application can write to (also referred to as update) the associated file. The Write lock, in conjunction with the Read lock, allows the directory group to keep data in the file consistent.

When an application desires to open an object, the directory group performs two checks: (1) are the modes the application is asking for going to conflict with another application that has already opened the object; and (2) are the operations that the application is willing to share the object for going to conflict with what another application has already opened the object for and indicated it is willing to share the object for. Six of the ten locks are directed to supporting this checking: Open Read, Open Write, Open Delete, Open Not Shared Read, Open Not Shared Write, and Open Not Shared Delete. These locks are used to grant an application the ability to open an object, but do not necessarily guarantee that the data for the object can be obtained (the Read lock or Write lock (depending on the type of operation the application desires to perform) is obtained to access the data).

Open Read Lock. The Open Read lock is requested by an application to allow the application to open the associated object for reading.

Open Write Lock. The Open Write lock is requested by an application to allow the application to open the associated object for writing. Open Delete Lock. The Open Delete lock is requested by an application to allow the application to open the associated object for deleting.

Open Not Shared Read Lock. The Open Not Shared Read lock is requested by an application when the application is not willing to share the ability to read the object with any other application.

Open Not Shared Write Lock. The Open Not Shared Write lock is requested by an application when the application is not willing to share the ability to write to the object with any other application.

Open Not Shared Delete Lock. The Open Not Shared Delete lock is requested by an application when the application is not willing to share the ability to delete the object with any other application.

The other two locks that are supported are the Insert Lock and the Exclusive Lock.

Insert Lock. The Insert lock is requested by an application to create a particular name for an object in a directory. Granting of the Insert lock gives the application permission to create the object with the particular name. The Insert lock conflicts with another Insert lock with the same object name, and with an Exclusive lock on the directory.

Exclusive Lock. The Exclusive lock is requested by an application to obtain all of the previously discussed nine locks, including an Insert lock on each possible name that could exist (but does not already exist) in the directory. An Exclusive lock on a directory does not imply Exclusive locks on the files or subdirectories in the directory, but rather only on the directory's namespace. The Exclusive lock conflicts with each of the previously discussed nine locks.

Various conflicts exist between the various different locks. Table I is a conflict matrix illustrating the conflicts between locks in one exemplary implementation. The following abbreviations are used in Table I: Ins (Insert), Excl (Exclusive), O-R (Open Read), O-W (Open Write), O-D (Open Delete), O-!R (Open Not Shared Read), O-!W (Open Not Shared Write), and O-!D (Open Not Shared Delete). An "X"

in a cell of Table I indicates a conflict between the corresponding two locks - for example, Open Read conflicts with Open Not Shared Read but does not conflict with Open Not Shared Write.

TABLE I

|      | Ins | Read | Write | Excl | O-R | O-W | O-D | O-!R | O-!W | O-!D |
|------|-----|------|-------|------|-----|-----|-----|------|------|------|
| Ins  | X   | X    | X     | X    |     |     |     |      |      |      |
| Read | X   |      | X     | X    |     |     |     |      |      |      |
| Write| X   | X    | X     | X    |     |     |     |      |      |      |
| Excl | X   | X    | X     | X    | X   | X   | X   | X    | X    | X    |
| O-R  |     |      |       | X    |     |     | X   |      |      |      |
| O-W  |     |      |       | X    |     |     |     |      | X    |      |
| O-D  |     |      |       | X    |     |     |     |      |      | X    |
| O-!R |     |      |       | X    | X   |     |     |      |      |      |
| O-!W |     |      |       | X    |     | X   |     |      |      |      |
| O-!D |     |      |       | X    |     |     | X   |      |      |      |

In an attempt to improve performance when only one client computer accesses some region of the namespace, the file system 150 may issue a lock with broader scope than an application executing on the client requests, under the assumption that the application (or client) is likely to request additional related locks in the near future. For example, if an application opens file /A/BIC/foo.txt, the client requests a lock for this file. If the directory group grants the lock, it may upgrade the lock to a directory lock on IAIB/C (e.g., if, based on past performance, the directory group determines that conflicts on the directory are rare). If the application then opens another file in the same directory, the client can open the file without needing to request another lock from the directory group.

If a clients lock request conflicts with an existing lock granted to another client, the directory group may attempt to downgrade the earlier-issued lock to one that will not conflict with the new request rather than denying the request. Since lock upgrades result in clients holding locks that they did not request, lock downgrades typically have a non-trivial likelihood of success. If the lock recall fails, then the request is denied.

Various operations can be performed on objects in a file system. Table II below describes several of the more common operations and what locks are requested by an application in order to perform the operations.

TABLE II

| Operation | Description |
|-----------|-------------|
| Read Object | A request to read a directory or file. Requires an Open Read lock for the object followed by a Read lock. Optionally, if desired, the application may request any of the Open Not Shared locks. |
| Write/Update Object | A request to write to a file. Requires an Open Write lock for the object followed by a Write lock. Optionally, if desired, the application may request any of the Open Not Shared locks. |
| Delete File | A request to delete a file in a directory. Requires the Open Delete and Write locks. Usually the application will also request all of the Open Not Shared locks. |
| Delete Directory | A request to delete a directory. Requires an Exclusive lock for the directory. Directories may only be deleted when they are empty. |
| Rename Directory | A request to rename a directory. Requires an Exclusive lock on the parent directory (the directory for which the directory being renamed is a subdirectory), and an Insert lock for the new directory name in the destination directory. If the rename is across directories then the insert lock will be required for the new parent directory. |
| Rename File | A request to rename a file in a directory. Requires a Write lock on the file, and an Insert lock for the new name in the directory (which may be a different directory, if the rename is across directories). |
| Create Object | A request to create a new file or directory. Requires an Insert lock for the new name. |

Any changes made to a file are made locally by the computer and then the file (after being encrypted) is pushed back to the directory group responsible for managing the file. This information is stored to the various computers in the directory group, and the updated file is stored to the appropriate computers.

Secure Crash Recovery

Referring back to FIG. 1, the system described above provides protection against change or access by unauthorized users and machines for storing files in distributed file system 150 and for managing the storage of files and the directory entries. Protection is provided for directory entries and for the files saved on multiple different computers in the system, even though files are replicated and stored in system 150 on multiple different computers in the system. For file writes, the number of computers required to cooperate despite a number of failed/unsafe computers f (an unsafe/failed computer may be compromised or otherwise unavailable, such as powered down}, the Byzantine-fault-tolerant group should include at least 3f+1 computers. In distributed file system 150, the directory entries are stored on the 3f+1 computers of a Byzantine-fault-tolerant group, while the file itself is stored onf+1 computers (which may be one or more of the same computers on which the directory entry is stored).

For file writes, there needs to be protection after a catastrophic fault even to a local machine, such as a crash, or after a user logs out of the machine. More specifically, when a user is logged into a machine, that machine updates the file on the user's behalf Any updates done to files that are part of the distributed file system are not immediately uploaded to the system. Rather, immediate uploads are prohibitively expensive in terms of system resources. If after logging in and making updates, a user logs out of the machine or the machine crashes, there needs to be protection against the machine's retaining the ability to act on the user's behalf if the user is no longer logged in, while the machine retains the ability to upload the changes legitimately made by the user prior to the crash or log out event. Having each write signed by a user's RSA private key would allow later uploads because the machine stores the signature authenticating the write along with the data. When the machine needed to convince the secure directory group of a write's authenticity, the machine would send the certificate along with the data. Unfortunately, this solution again requires excessive machine resources. For example, the signature based on an RSA private-key operation costs approximately 6.5 ms of computer processing (CPU) time on a 1 GHz processor compared to the disk latency of approximately 6-8 ms in a modem disk. The system preferably would avoid such expense on the critical path of a file write. According to embodiments provided herein, the protection is efficient for a system such as system 150 and provides protection for file writes when a user's secrets are not available at the time of presenting the proof.

Power-of-Attorney Certificate

Figure 7:
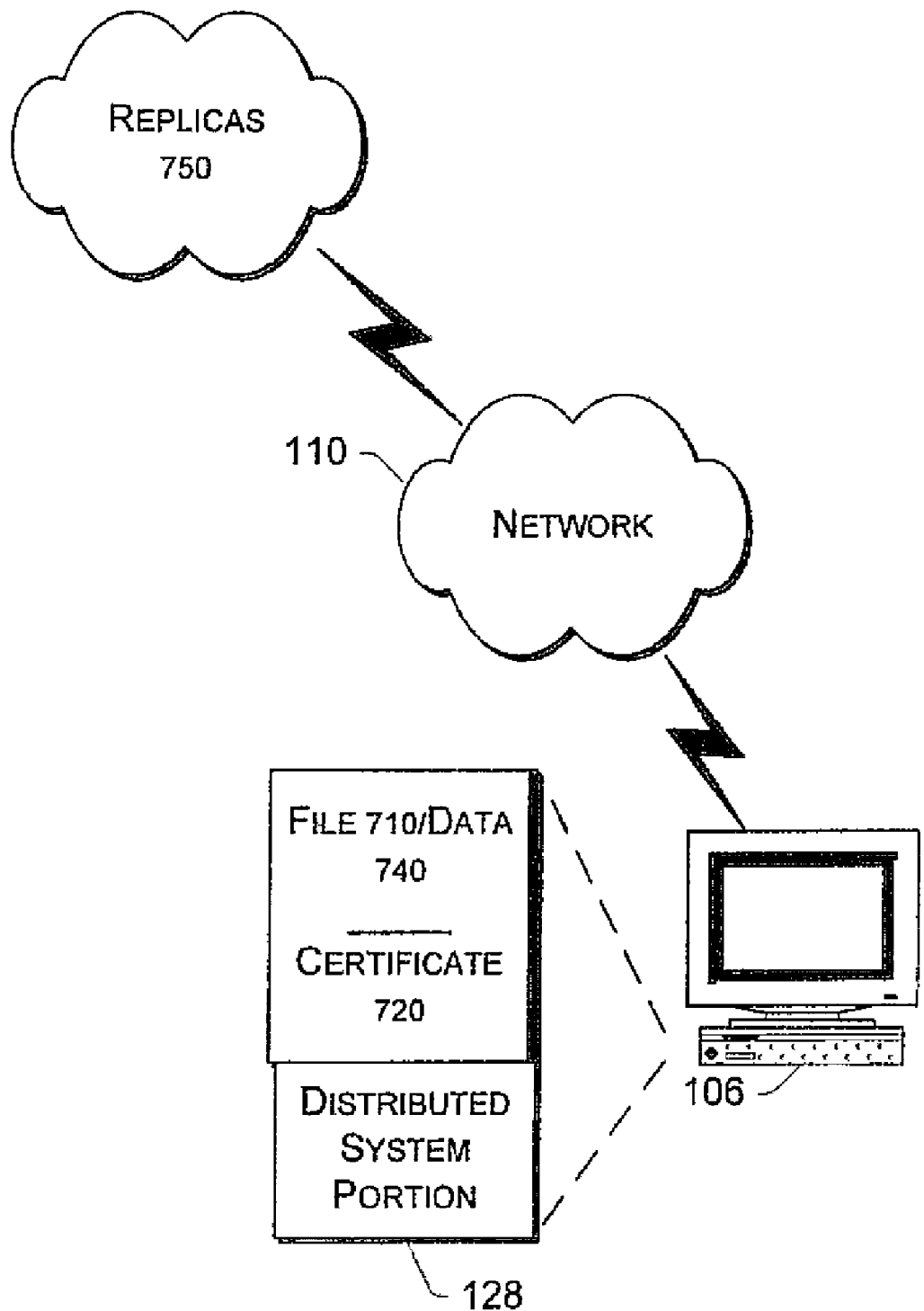
FIG. 7 illustrates an exemplary storage of a file and certificate in a serverless distributed file system.
Figure 8:
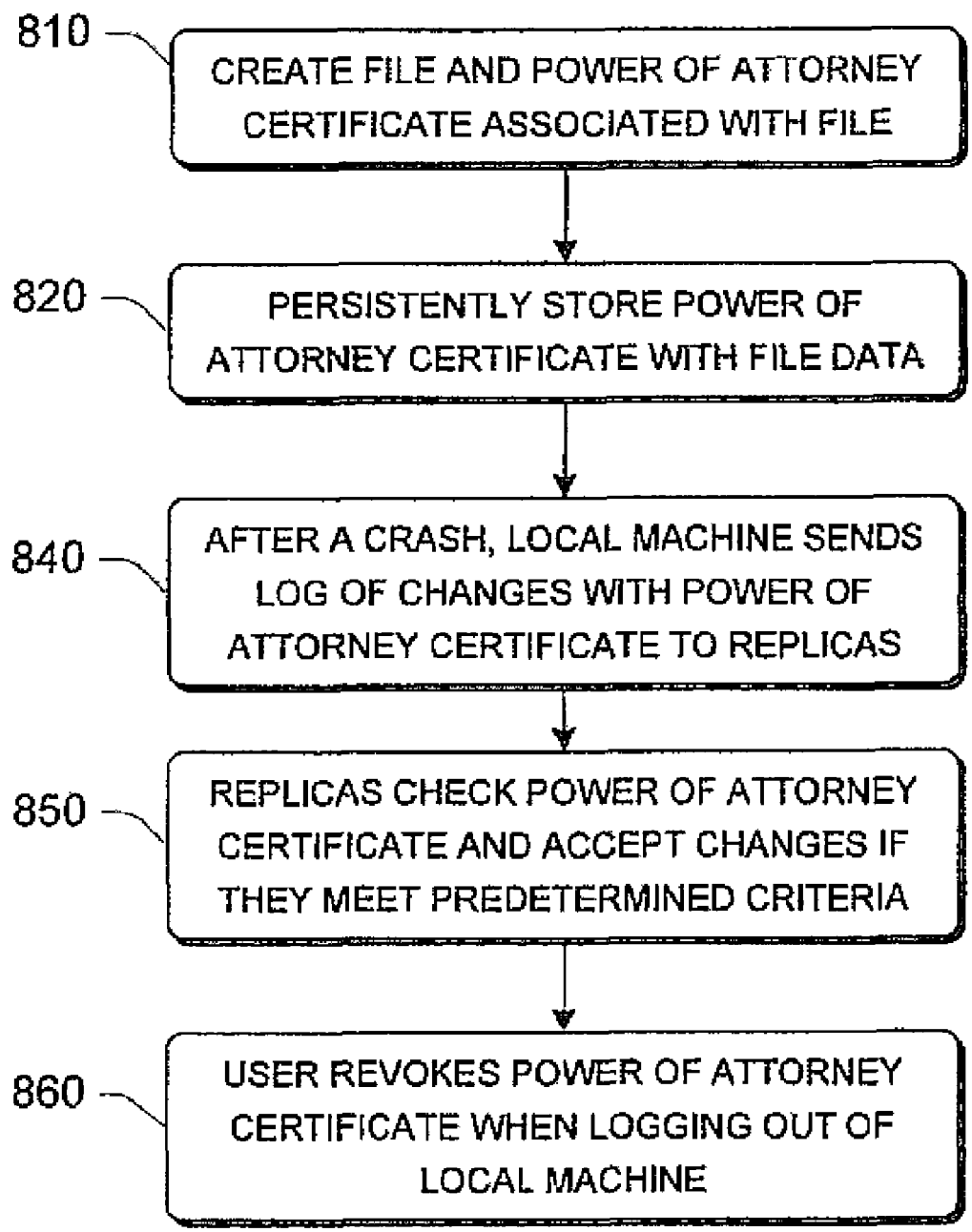
FIG. 8 is a flowchart illustrating an exemplary process for using power-of attorney certificates.

Referring to FIG. 7 and FIG. 8 in combination, one embodiment of the present invention addresses file write protection using power-of-attorney certificates. According to the embodiment, when a user first writes a file 710, the user signs a power-of-attorney certificate 720 with the user's private signature key that authorizes the client software 204 to machine 106 to update the file 710 on the user's behalf according to predetermined criteria indicated on the power-of-attorney certificate (act 810). For example, the criteria may limit the power-of-attorney certificate to a limited amount of time and/or allow changes only for a new version number of file 710. The client machine 106 stores the certificate in the distributed file portion 128 of a local disk along with the encrypted file data (act 820). On any subsequent writes to the same file, machine 106 writes the data to distributed file portion 128. If machine 106 crashes and reboots and has file updates for network 110, machine 106 sends a log of updates to the replicas 750 in the directory group and includes the power-of-attorney certificate 720 (act 840). The replicas 750 check the power-of-attorney certificate and only accept the changes if they meet the predetermined criteria (act 850), such as indication that identifies a correct version number, that the certificate did not expire and names the right machine. In the normal case when the machine doesn't crash, the file is closed normally and a hash representation of the file contents stored in the directory can be sent to the replicas 750, for example, using secure machine-to-machine connections which are likely to exist already. If the user logs out of machine 106 before the changes are uploaded to the replica group 750, the hashes of modified files are signed with a users' private key. A user revokes the power-of-attorney certificate when the user logs out to insure that the replicas 750 will not accept more requests from machine 106 on the user's behalf (act 860). The revocation involves executing a replicated operation to store a revocation certificate.

In one embodiment, the power-of-attorney certificate is one of several security items checked by the directory group. For example, if a crash occurs to the local machine before file 710 is closed and before updates are sent to the directory, once the updates are received by the directory group, a file's validity can be checked by comparing a user's signature on the power-of-attorney certificate 720 and machine 106's signature on file 710 contents.

Although the method described in FIG. 7 and 8 does not compromise a user's key if machine 106 crashes, it has some drawbacks. More particularly, suppose a user writes file 710 on machine 106, and machine 106 crashes and is compromised, for example, such that file 710 is open at the time of crash. Because a power-of-attorney certificate from the user exists on machine 106 and the power-of-attorney certificate was not revoked by the user, machine 106 could change file 710 in an arbitrary manner after it reboots. Thus, for certain types of files that are always open, such as database files in Outlook, the vulnerability could be an unwanted risk. Thus, if an involuntary shutdown takes place, it will usually result in the power-of-attorney certificate being used for the Outlook .pst files, an attacker could exploit this vulnerability at that time. However, the power-of-attorney certificate method protects files in the sense that the power-of-attorney certificate vulnerabilities are limited to only those files subject to amendment at the time of a crash. Thus, any files not subject to that certificate are safe from amendment.

In one embodiment, the power-of-attorney certificate is time-bound with an expiration date and/or time. An expiration at an inopportune time of the power-of-attorney certificate, however, can cause additional problems if a local machine loses the ability to upload data. On the other hand, requiring a longer time out for the power-of-attorney certificate to allow uploads of data also gives potential attackers a long period during which machine 106 is vulnerable. To combat this weakness, one embodiment is directed to making a recovered machine contact the group very soon after a crash, if it is possible to do so. For example, machine 106 could be holding corrupted files immediately after reboot or the machine takes a long time to reboot such that file 710 cannot be sent back to network 110.

In one embodiment, power-of-attorney certificate 720 is generated upon a first write. Alternatively, the power-of-attorney certificate can be generated sometime between opening file 710 with write permissions and a first write. A signed power-of-attorney certificate 720 can be added to a local log on machine 106 at the time it is generated.

The signing of a power-of-attorney certificate can be avoided for every file if a directory group were to issue more powerful power-of-attorney certificates on behalf of the user. For example, the power-of-attorney certificate can cover all files in a directory (on which the user has write permissions), or for some other set of files for a limited set of version numbers. Of course, this increases the vulnerability of a user, i.e., the machine can now act on behalf of a user for all of user's files (that the user has permission to modify) in the set after a crash.

Delegating Authority Using Secret Sharing

Figure 9:
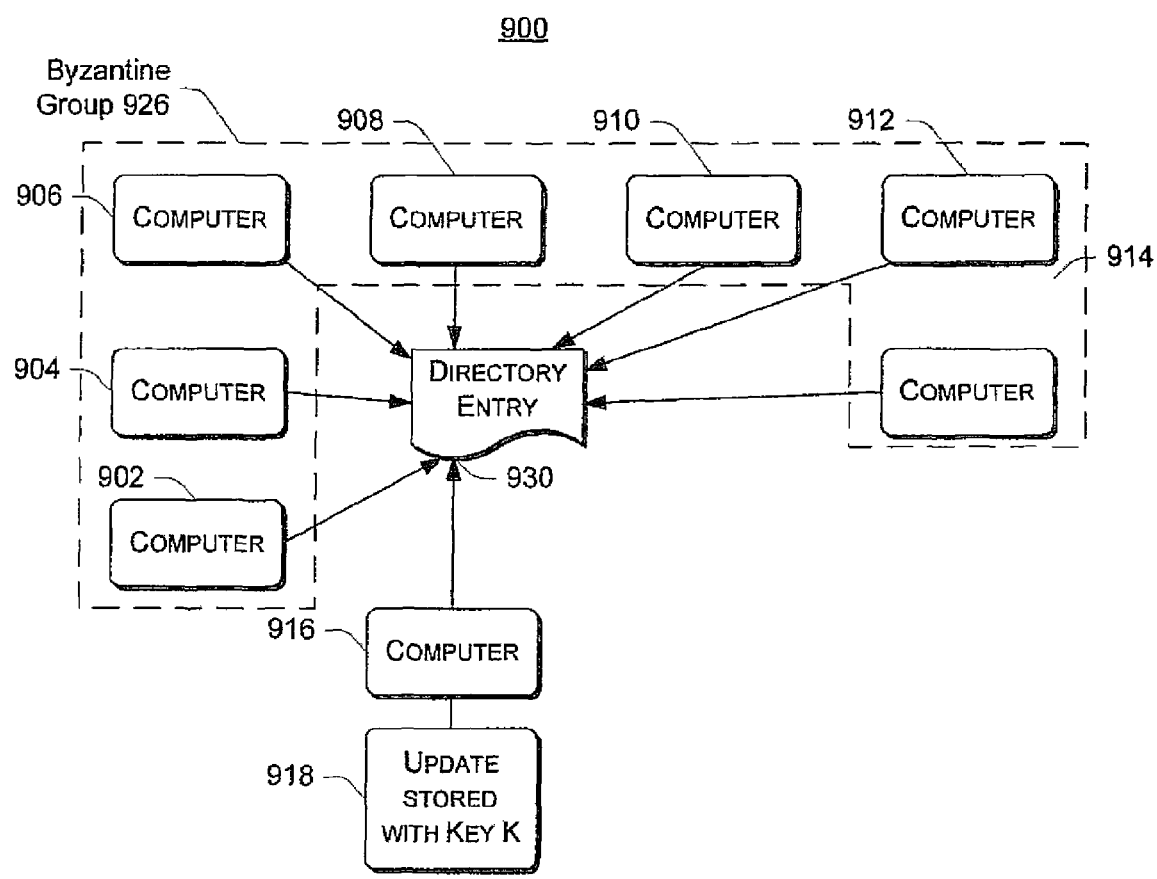
FIG. 9 illustrates an exemplary storage of a file using a private key in a serverless distributed file system.
Figure 10:
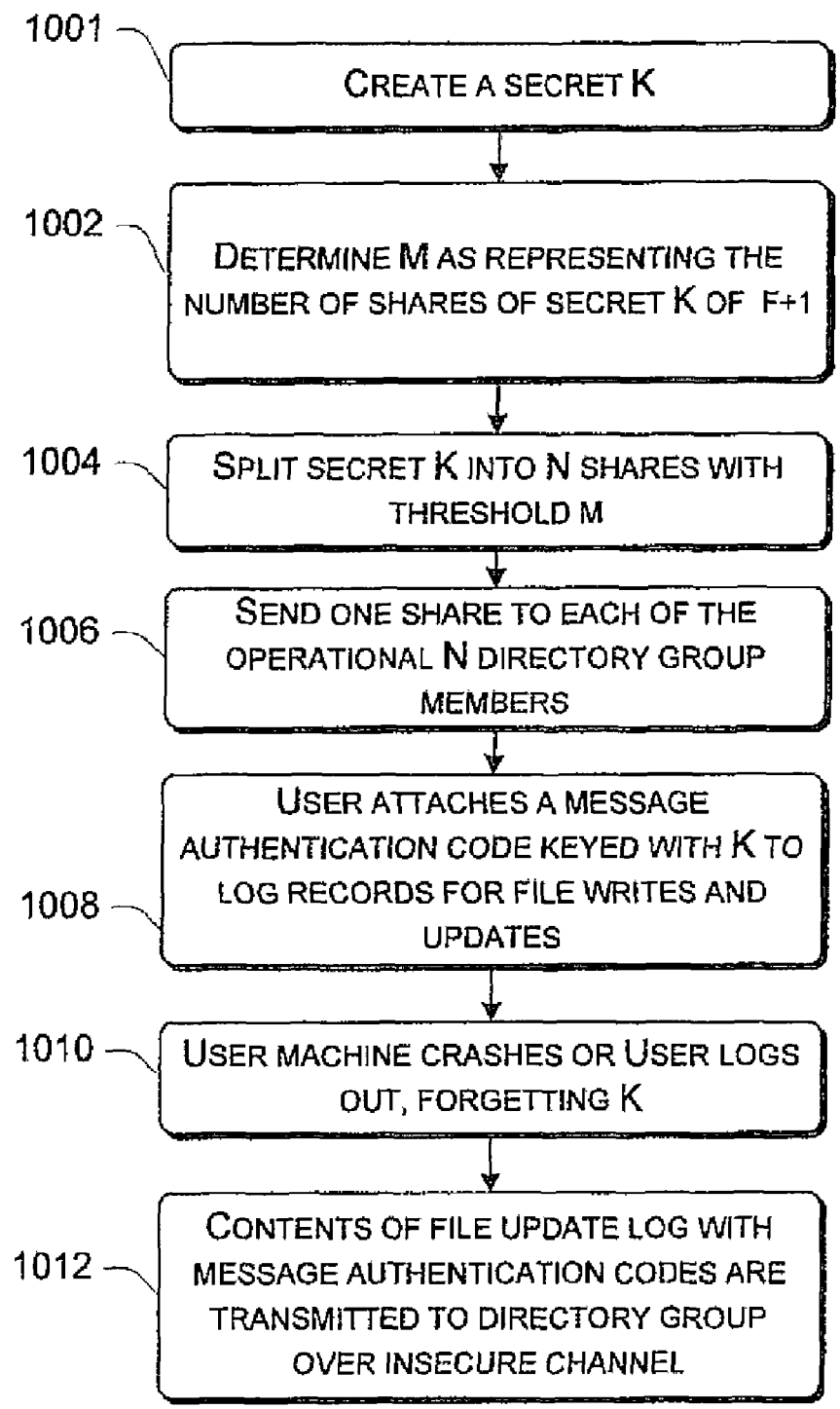
FIG. 10 is a flowchart illustrating an exemplary process for uploading file updates according to a secret key sharing embodiment.

Referring now to FIG. 9 in combination with FIG. 10, another embodiment is directed to an approach that avoids private-key signatures on the critical path of file writes without requiring that a client machine be trusted after a file is written. As shown in FIG. 9, file system 900 is a Byzantine-fault tolerant group 926 including seven computers 902, 904, 906, 908, 910, 912, and 914. Assuming that the designer of system 900 desires to be able to tolerate two computer failures, the Byzantine-fault-tolerant group includes at least seven ((3·2)+1) computers. Directory entry 930 is shared with the seven computers 902-914.

In general, when client computer 916 requests a write-lock for a file update such as update 918 from Byzantine group 926, it does so on behalf of a user. When the lock is issued, the user is allowed to generate a new version of the file. Version numbers are incremented when client computer 916 releases the write-lock and has actually modified the file.

According to a method using secret sharing, when a client computer 916 contacts the directory group 926 and, for example, wishes to file write on behalf of a user, a secret K is created (act 1001). The user determines M as representing the number of shares of the secret, or different portions of the secret, needed to determine the secret and is determined by M being f+1 (act 1002); and the user splits secret K into N shares with reconstruction threshold M (act 1004). For group 926, M must be three. Thus, a user/creator of the secret must choose N to be the size of the replica group 926 holding the directory entry (3f+1) and M=NN/3J+1=f+1.

When first contacting a directory group, the user via client 916, passes the N shares, in this case seven shares, one to each member of the group 926 (act 1006) (but if some group members are not active in the group, client 916 does not send the shares for those group members until and unless those members become active; by hypothesis at most f members can be inactive at any one time). Three computers of computers 902-914 are required to recover secret K, which can be a key, such as a symmetric key. The secret K is known by the user on client computer 916 and the user uses the secret K to authenticate file writes and file updates that are to be sent to the directory group 926. Specifically, when a user on client 916 updates files, a message authentication code (MAC) is created using secret K as a key with the file update (act 1008). As is known, a MAC can be a one-way hash function such as an SHA-1 type hash of the file data encrypted by a symmetric key, in this case secret K. Depending on system requirements, the secret K can be combined with a portion of the file data to create the MAC, or can be combined with an entire update to form the C. A system that considers the expense of the MAC formation as a limiting factor can apply the method on a portion of the data and save computing resources. Conversely, if a system considers the expense of the MAC formation as of less importance than security, the method can apply the MAC formation to include whole files.

The secret K and its N shares are stored on client machine 916 such that if the machine should crash or the user should log out (act 1010), they will be forgotten. Therefore, if the machine crashes or the user logs out, the machine will be unable to generate MACs for log entries that have not already had MACs attached, since generating such a MAC requires knowledge of the forgotten secret K. If there is no crash or log out event, the machine will retain the user's credentials, which can be used to establish a secure connection to the server group 926 over which the group will accept the log without needing to verify the attached MACs. Conversely, if there is a crash or log out, the machine will not retain the user's credentials, will not be able to establish an appropriate secure connection to the server group 926 and instead, when client computer 916 is able, which can be upon reboot, for example, client computer 916, according to one embodiment, automatically sends the update and the associated MAC to the group over an insecure channel (act 1010).

Figure 11:
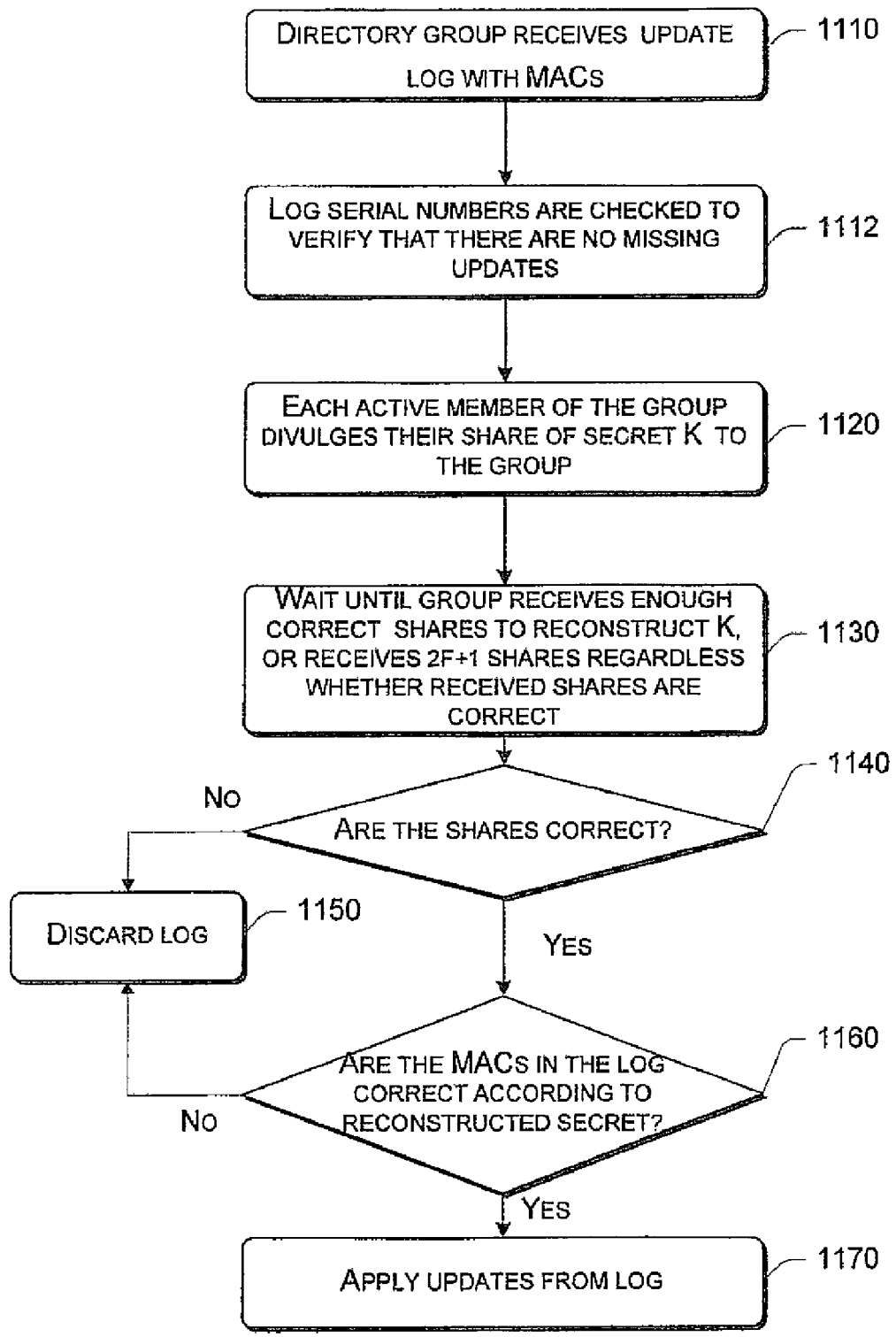
FIG. 11 is a flowchart illustrating an exemplary process for determining whether to allow file updates according to a secret key sharing embodiment.

The directory group 926 receives the MACs and updates in the form of a log. Because the log is sent outside of an authenticated session, however, the secret sharing method allows the updates to occur because the MACs are created using the secret K. More particularly, as shown in FIG. 11, the directory group receives the MACs and updates in an update log (act 1110). The directory group checks log serial numbers to verify that there are no missing updates (act 1112) and each active and correctly functioning member of the group then divulges their share of secret K (act 1120). The directory group 926 waits until it has received M correct shares of K or until it receives 2f+1 shares, regardless of whether the shares received are correct (act 1130). The directory group determines whether the shares received are correct (act 1140). More specifically, if the shares received do not constitute a correct set of shares of some secret K, then the directory group assumes that the client was corrupt when it generated the shares, and discards the log (acts 1140 and 1150). If the secret K is reconstructed, the directory group 926 uses the secret K to verify the MACs in the update log (act 1160). If the MACs are correct, the directory group accepts the log as being authentic and applies the updates in the log as if they came from the user in question over an authenticated channel (act 1170). If the MACs do not check, then the log is discarded (act 1150). According to one embodiment, the decision to discard a log further includes checking a serial number assigned to updates within the log. For example, before a directory group performs the act of divulging their share of secret K, each log received by the directory group can be checked against a list of serial numbers or other sequence checking mechanism to verify that logs received are in a predetermined order (act 1112). That way, out-of-sequence updates are not allowed to occur and a malicious machine cannot delete operations from the middle of a valid log and send the remainder without being detected. After sequence checking is accomplished, members can then divulge their share of the secret K (act 1120); if the shares do not recreate secret K or if 2f+1 correct shares are not received (act 1130 and 1140), the directory group discards the log (act 1150).

In one embodiment, the secret K is a single key associated for all of the writes that share the same user, client machine and directory group. In the embodiment, the MACs are sent to each member in the directory group, and at least f+1 members with a share of the secret K are needed to reconstruct the key. Thus, in the embodiment, the key can cover all the writes that are relevant for a particular Byzantine group.

Authenticators

Figure 12:
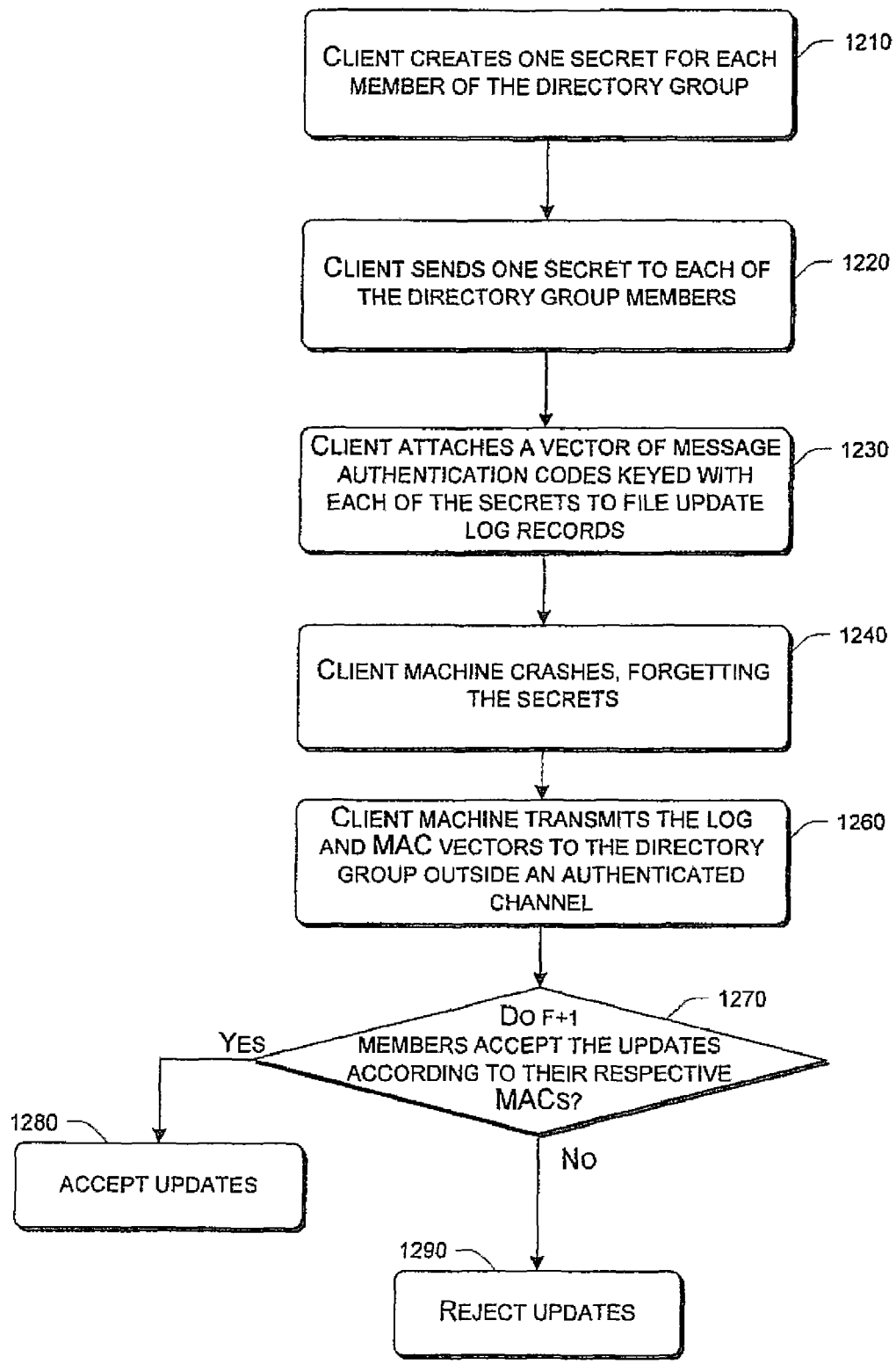
FIG. 12 is a flowchart illustrating an exemplary process for determining whether to allow file updates according to a vector of authenticators embodiment.

According to another embodiment, instead of secret sharing, file writes are protected with a vector of message authentication codes (MACs). In the embodiment, authority is delegated to a vector of message authentication codes without requiring additional trust from a client machine. Referring to FIG. 12, a client machine creates a plurality of secrets configured to be distributed among the members of the directory group, creating one secret for each member of the directory group (act 1210). The plurality of secrets can include a plurality of secret symmetric session keys that are established individually with each member of the directory group, thus creating a symmetric key relationship between each member machine and an individual user. The user can create a file and transmit the file to the directory group along with the plurality of secrets or can establish the symmetric key relationship with each of the members off-line without also transmitting a file. In any event, a client machine sends one secret to each of the directory group members (act 1220).

In general, when a user generates updates and stores the updates in a log for future transmission, the log includes a plurality of messages, each of which having an attached vector of MACs, each MAC in the vector keyed with one of the keys generated at act 1210 (act 1230). In the event that a client machine is disabled via a crash or other catastrophic event, such as causing the authenticated channel session to end abruptly, according to an embodiment, the client forgets the keys (act 1240) and the updates in the log are sent outside of the authenticated channel (act 1260). Each MAC in the vector of MACS is a one-way hash function of the update log record (which itself includes a secure hash of the file contents) encrypted by a symmetric key, or one of a number of other MAC algorithms, as one skilled in the art will appreciate. In this case, instead of one MAC being sent, a plurality of MACS are sent, each MAC using a different secret key known only to the client and one member of the directory group. Each correctly functioning member of the directory group receives a key. In one embodiment, a separate symmetric key is established for each user, client machine, and each directory group member. For example, a user can authenticate each write by computing an authenticator with one MAC entry for each replica/directory group member. After a client machine reboots following a crash or the like (act 1240), upon recovery, the machine can transmit the authenticator to the directory group (act 1260). Each member of the group separately verifies its corresponding MAC and accepts the updates or rejects the updates (acts 1270, 1280 and 1290). In one embodiment, f+1 verifications of the MACs are required (act 1270) to authorize the updates (act 1280); otherwise, the updates are rejected (act 1290).

In one embodiment, one or more of the symmetric keys used to create at least one of the MACs in the vector of MACs is a key also used for other purposes such as to authenticate requests to one or more members of the directory group. In a further embodiment, like the secret sharing method described above, each update can be associated with a serial number such that out of sequence updates are not permitted.

Advantageously, in both the secret sharing method and the method using the MAC vectors, assuming the cryptographic method to compute the MAC/MACs is strong enough, an attacker will only be able to forge a write request if it gains control over f+1 Byzantine group members or if it is able to learn the secret key/keys from the client machine. The key(s) in the client machine is preferably kept in main memory and in pinned pages to avoid going to a paging file, such that the key is discarded if the machine crashes. Furthermore, the user can discard the key/keys at any time, and, more particularly, a user in one embodiment is required to discard the key if the user wants to logout.

Version Verification

Each of the power-of-attorney certificate, secret sharing and MAC vector methods described above can include further protection before an update and/or file signature has been stored by a Byzantine group.

Figure 13:
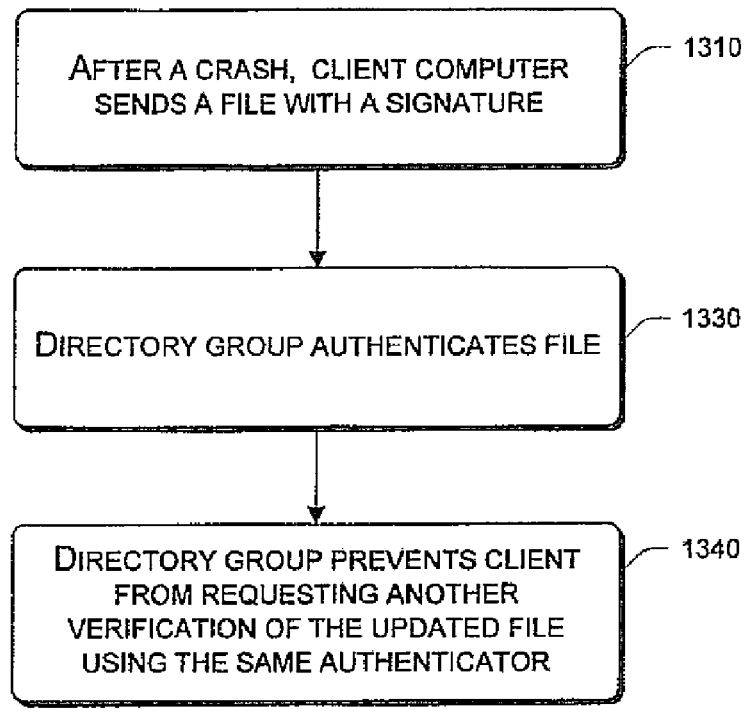
FIG. 13 is a flowchart illustrating an exemplary process for verification of files.

More specifically, referring to FIG. 13 in combination with FIG. 9, a method is directed to version verification. After a crash, a client computer 916 sends a file with a signature, which can be based on a secret K type key and the relevant information to the Byzantine group 926 for verification purposes (act 1310). The Byzantine group 926 operates according to one of the methods described above, either reconstructing the lock-secret key at all the replicas and using it to verify a MAC; checking a power-of-attorney certificate; or verifying a vector of MACs. In any event, for the secret sharing method, the secret key is no longer a secret. In each of the methods, an authentication is checked (act 1330). Specifically, for the power-of-attorney certificate method, the certificate is checked and the directory group stores a hash of the file if the certificate is valid. For the secret sharing method, the servers verify the file MAC and store the hash of the file if the MAC is correct. For the MAC vector authenticators method, the servers verify the vector of MACS and store a hash of the file if the MAC vector is verified.

After this point, according to the method, client 916 is prevented from requesting another verification of the updated file using the authenticator (certificate, shared secret or MAC vector) that was provided (act 1340). That is, these authenticators are good for only a single use. Thus, if a faulty replica leaks a key or share of a key after it has been reconstructed, no damage can be done with the revealed key because the file hash of the update has already been revealed to the replicas and they will only verify that particular hash. For example, suppose that the faulty replica colludes with a now-faulty client 916 and attempts to generate a new hash for a corrupt version of a file. Because the replicas already have the original hash, they will not accept a different hash for that version of the file, i.e., client 916 has already "committed" the signed data to the Byzantine group 926 before the secret-key reconstruction was initiated by the Byzantine group. The method can be similar to some random-number generation protocols wherein one commits a hash on the data before revealing the data.

Figure 14:
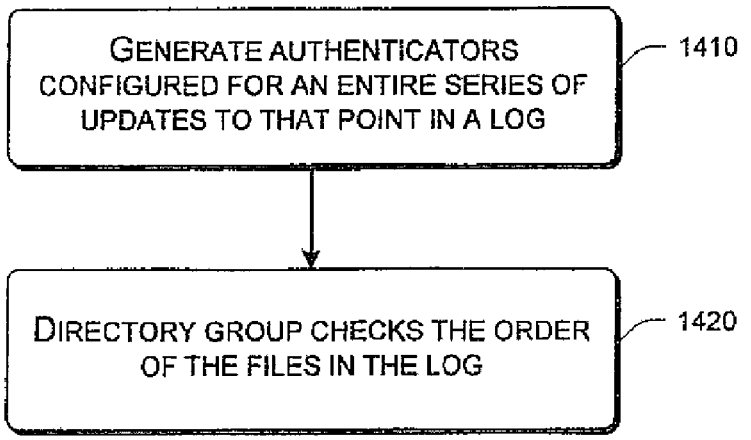
FIG. 14 is a flowchart illustrating an exemplary process for preventing replay attacks.

Referring to FIG. 14, an embodiment is directed to using the verification to prevent selective replay attacks. Specifically, the authenticators in each of the secret-sharing, authenticator and power-of-attorney certificate embodiments are authenticating the contents of a particular file. Thus, if a machine is corrupted after a crash and before replaying its log to the directory group, an attacker could pick and choose which updates to send to the directory group, and which to ignore.

For example, consider a machine that is updating three files, F1, F2, and F3. The user writes first F1, then F2 and finally F3. The client machine applies these writes to the files, generates authenticators A1, A2 and A3 for the three new files (generated with any of the embodiments described above), and stores them in its log. If the client machine then crashes and is corrupted before it reboots, an attacker could find the updated versions of the three files along with valid authenticators. Although an attacker cannot create new authenticators, an attacker could report the changes to only F3 without F1 or F2 to the directory group, even though the user believed that F3 was updated after F1 and F2.

To defend against this attack, an embodiment is described with reference to FIG. 14. First, the generated uthenticators are configured not for just a particular updated file, but for the entire series of updates to that point in the log (act 1410). In the example above, a directory group would compute A1, then A1,2 then A1,2,3, which would authenticate the update to file 1, then the updates to both files I and 2, and finally all three updates. If a client machine becomes corrupted, the machine would be free to send back one of these three authenticators, but the machine would be unable to convince the directory group that file 3 was updated but that files 1 and 2 were not. Thus, the directory group checks the order of the files in the log (act 1420).

All three embodiments described above are forms of a digital signature over some data, e.g., a "signature" function such as A(data). When a user begins a fresh log and a directory group receives a first update, authenticating the change to the first file, can be represented as: A(h(FI )). A file contents hash is over not only the data, but also metadata that contains a file ID. Thus, it is not possible to use the authenticator for one file to change the contents of another file. When a second file is updated, the directory group generates A(h(h(FI);h(F2))). Specifically, the directory group concatenates the contents hash of the first file with the contents hash of the second, hash those together, and authenticate the result. For a third file, the directory group generates A(h(h(h(F1);h(F2));h(F3))). Thus, the directory group keeps track of one extra hash in memory, and then hashes that together with any newly updated file contents before computing the new authenticator.

In an embodiment, the directory group builds up a single log of updates for a particular group that includes both changes in file contents, as well as other operations such as locks released, changes to access control lists, files renamed/deleted and the like. Eventually, a user uploads the log, which includes the other operations back to the directory group, which applies the updates to the group's copy of the directory information. The entries in this unified log have authenticators constructed using one of the previously described methods, and so may be securely uploaded after a crash. If a log is uploaded prior to a crash or log out, the client can start a fresh authenticator for the new log (which does not include the contents of the previously uploaded log), because the client could no longer convince the directory group that the first log didn't exist.

Costs of Secret-Sharing and Authenticator Methods

The difference between the secret-sharing method and the MAC vector authenticators method depends on system requirements. More particularly, let M be the time to generate a MAC of a SHA-1 hash; SSG be the time to generate the shares of the secret lock key and send them to the replicas; and SSR be the time to reconstruct the secret lock key from the shares. Further parameters include the number of faults tolerated by the Byzantine group, f, on the average number of delayed writes, W, to the disk before the client logs out, and the ratio, R, between the number of recoveries and the number of writes.

The secret-sharing embodiment requires a user on a client machine to generate the shares of the secret lock key, which takes SSG seconds, when the first operation to a Byzantine group is executed on behalf of the user. In the critical path of the delayed write, the embodiment adds a MAC computation, which costs M seconds. At recovery time, the replicas reconstruct the key before validating the file hash, which costs SSR seconds.

The authenticator-based embodiment can require a symmetric session key to be generated when a user communicates with a Byzantine group member for the first time. The cost of generating these keys is small and these keys can be sent on the existing secure channels between the client machine and the replicas in the directory group. On the critical path of a delayed file write, the authenticator-based embodiment requires 3f+1 MAC computations, which cost M seconds each, for generating the authenticator. Actually, 2f+1 encryptions are sufficient because they will convince f+1 correct replicas that will be able to convince the others. At recovery time, each replica uses its symmetric key to validate the file hash, which costs M seconds; no extra reconstruction work is done.

The secret-splitting embodiment pays an upfront cost when a user contacts a Byzantine group for the first time; it also pays the reconstruction cost penalty when a crash happens on a file that has not had its updates uploaded to the directory group prior to the crash. However, the secret-splitting embodiment has lower costs on the critical path. When a page modification is written to the log the secret-sharing approach needs to compute the file hash and compute a MAC of the hash. The MAC-vector-based embodiment has to compute the file hash and compute 2f+1 MACs of the hash (i.e., 7 MACs for f3). The cost of the secret-sharing based scheme is, therefore: CSS=SSG+W*M+W*R*SSR The cost of the authenticator based scheme is, therefore: CA=W*(2f+1)*M+W*R*M The break even point is for: W=SSG/(2f*M+R(M−SSR))

Thus, the tradeoff depends on the relative cost of generating the shares of the lock secret key, signing a hash using RSA, computing the MAC of a hash, and reconstructing the secret key from the shares.

If the embodiments assume use of RC2 with 128 bit keys to compute a MAC on a 1 GHz Pentium, it takes M=8 μs to compute the MAC. Assuming f=3 and R-O, and the secret-sharing scheme takes one MAC computation in the critical path of a write from the file cache to the disk, the authenticator-based approach would do 7 equivalent MAC computations for a cost of about 56 gs. Thus, in terms of critical path latency, both schemes have very low time overheads compared to the disk write latency (6-8 ms) and the time to compute the hash of the file.

The secret-sharing approach has to log one data record, about 24 bytes while the authenticator-based embodiment needs to log 7 records (168 bytes). The byte overhead in the authenticator-based approach is higher but the absolute number of 168 bytes is very low. This overhead is only for files that have been modified and whose hash has not been flushed to the directory group yet.

Assuming SSG to generate 10 shares of a 128 bit lock secret key is 1.5 ms [1] and the time to generate a signature is 6.5 ms, the break-even point is W=31.

For MAC computations, for example, computing HMAC-SHA1, should cost about 2 j.s in a PIII 1 GHZ, giving a break even point of W=125. Using UMAC2/8, which is a provably secure MAC construction, the cost of generating a MAC for 32 bytes in a PIII Katmai 600 MHz is 0.62 μs, giving a break even point of W-403. For this message size UMAC uses RC6 in CBC mode to compute the MAC. UMAC218 has an 8 b e nonce that can be reused for all replicas and an 8 b e tag that is per replica. Thus, it logs a total of 64 bytes; only 48 bytes more than the secret sharing embodiment.

On recovery, both the secret-splitting embodiment and the authenticator-based embodiment communicate all of the appropriate data to all of the servers. The amount sent out is equal for both schemes, but the secret-splitting embodiment sends the same thing to everyone, while the authenticator-based scheme sends different but equally sized records to everyone. The former needs to break the secret at each of the 10 servers. For the 1017 numbers, the cost is somewhere between 25-30 ms, probably less for 1014. The authenticator-based embodiment requires a MAC computation over the file hash at each server.

So taking recovery into account with R=1e-4 and using HMAC-SHA1, the break even point is W=158. It is W=128 with R=1e-5

Essentially, the secret-splitting embodiment trades computational overhead in setup and recovery for the authenticator-based scheme's computational overhead in the mainline non-cached write path. The break-even point varies with the technology used for MAC computation and secret-sharing, and also depends on the number of writes authenticated with the same lock-secret key and the number of writes between recoveries.

Conclusion

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

We claim:

1. A method for securely updating files in a distributed directory group with a plurality of members therein, the method comprising:
   receiving by each member of the plurality of members one secret of a plurality of secrets;
   receiving over an insecure channel a transmission containing one or more file updates secured with a hash of file content and a vector of message authentication codes created using the plurality of secrets; and
   authenticating the file updates by requiring a predetermined number of members in the distributed directory group to verify a predetermined number of the message authentication codes in the vector of message authentication codes,
   wherein the total number of members is 3f+1, the number of members required to verify the predetermined number of message authentication codes is f+1, and the total number of message authentication codes in the vector of message authentication codes is 2f+1, wherein f is the number of faults tolerable by the distributed directory group.

2. The method of 1 wherein the message authentication codes are UMAC message authentication codes.

3. The method of 1 wherein a user establishes a symmetric key relationship with each member of the distributed directory group.

4. A computer-readable storage device having computer-executable instructions stored thereon for performing acts comprising:
   receiving by each member of a distributed directory group with a plurality of members one secret of a plurality of secrets;
   receiving over an insecure channel a transmission containing one or more file updates secured with a hash of file content and a vector of message authentication codes created using the plurality of secrets; and authenticating the file updates by requiring a predetermined number of members in the distributed directory group to verify a predetermined number of the message authentication codes in the vector of message authentication codes, wherein the total number of members is 3f+1, the number of members required to verify the predetermined number of message authentication codes is f+1, and the total number of message authentication codes in the vector of message authentication codes is 2f+1, wherein f is the number of faults tolerable by the distributed directory group.

5. The computer-readable storage device according to claim 4, wherein the message authentication codes are UMAC message authentication codes.

6. The computer-readable storage device according to claim 4, wherein a user establishes a symmetric key relationship with each member of the distributed directory group.

7. A computing device comprising:
  a processor; and
  a plurality of programming instructions implementing a member of a distributed directory group with a plurality of members, the programming instructions configured to be operated by the processor to perform operations including:
    receiving one secret of a plurality of secrets, each member of the plurality of members receiving a different one of the plurality of secrets;
    receiving over an insecure channel a transmission containing one or more file updates secured with a hash of file content and a vector of message authentication codes created using the plurality of secrets; and
    authenticating the file updates by requiring a predetermined number of members in the distributed directory group to verify a predetermined number of the message authentication codes in the vector of message authentication codes,
    wherein the total number of members is 3f+1, the number of members required to verify the predetermined number of message authentication codes is f+1, and the total number of message authentication codes in the vector of message authentication codes is 2f+1, wherein f is the number of faults tolerable by the distributed directory group.

8. The computing device of claim 7, wherein the message authentication codes are UMAC message authentication codes.

9. The computing device of claim 7, wherein a user establishes a symmetric key relationship with each member of the distributed directory group.

* * * * *